US010181235B2

(12) United States Patent
Kogo

(10) Patent No.: US 10,181,235 B2
(45) Date of Patent: Jan. 15, 2019

(54) TYPING-GAME MACHINE AND DATABASE SYSTEM

(75) Inventor: Junichi Kogo, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 412 days.

(21) Appl. No.: 11/372,033

(22) Filed: Mar. 10, 2006

(65) Prior Publication Data

US 2006/0204941 A1 Sep. 14, 2006

(30) Foreign Application Priority Data

Mar. 11, 2005 (JP) ................................ 2005-068582

(51) Int. Cl.
*A63F 13/00* (2014.01)
*G07F 17/32* (2006.01)

(52) U.S. Cl.
CPC .......... *G07F 17/32* (2013.01); *G07F 17/3295* (2013.01)

(58) Field of Classification Search
CPC ........................ G07F 17/3244; G07F 17/3225
USPC ........................................................ 463/7, 9
See application file for complete search history.

(56) References Cited

U.S. PATENT DOCUMENTS 6,659,873 B1 * 12/2003 Kitano et al. ................... 463/42
6,780,105 B1 * 8/2004 Kaminkow ..................... 463/16
6,905,413 B1 * 6/2005 Terao et al. ..................... 463/40
2001/0014620 A1 * 8/2001 Nobe et al. ....................... 463/7
2002/0025842 A1 * 2/2002 Nobe et al. ....................... 463/7
2002/0111878 A1 * 8/2002 Namba .................. G06F 21/10 705/26.62
2005/0202868 A1 * 9/2005 Sawano ................. A63F 13/10 463/30

FOREIGN PATENT DOCUMENTS

JP 9-10440 1/1997
JP 2002-210226 7/2002
JP 2002-268534 9/2002
JP 2004-215722 8/2004

OTHER PUBLICATIONS

Typepad, Superbowl Advertising rates post small decline in 2008. Jan. 29, 2008.*

* cited by examiner

*Primary Examiner* — Kang Hu
*Assistant Examiner* — Thomas H Henry
(74) *Attorney, Agent, or Firm* — Lex IP Meister, PLLC

(57) ABSTRACT

A typing-game machine has a storage unit for storing a set of a video data item and a song data item for each song, a music playing unit for playing a song based on a song data item, a first image display unit for sequentially displaying a character string which is a part of lyrics of the song being played, a second image display unit for displaying a video image based on a video data item associated with the song being played, and a database making unit. A course of a game is controlled based on whether a character string inputted by typings of keys agrees with the character string displayed or not. The database making unit makes a database with respect to each song about the number of times a video image associated with a song is displayed along with a play of the song.

12 Claims, 19 Drawing Sheets

FIG. 15

211

| ADVERTISING-RATES TABLE | | |
|---|---|---|
| NUMBER OF USES | ADVERTISING RATES | |
| 2000~ | △○○○○○ | 401 |
| 1400~1999 | □○○○○ | 401 |
| 900~1399 | ×○○○○ | 401 |
| 500~899 | ×△○○ | 401 |
| 200~499 | ×□○○ | 401 |
| 100~199 | □×○ | 401 |
| 50~99 | □×× | 401 |
| 1~49 | △○ | 401 |
| 0 | 0 | 401 |

TYPING-GAME MACHINE AND DATABASE SYSTEM

CROSS REFERENCE TO RELATED APPLICATION

This application is based upon and claims the benefit of priority from the prior Japanese Patent Application No. 2005-068582, filed on Mar. 11, 2005, the entire contents of which are incorporated herein by reference.

BACKGROUND OF THE INVENTION

1. Field of the Invention

The present invention relates to a typing-game machine which simultaneously displays lyrics and a promotion video of a song used for a typing game, and also relates to a database system which includes the typing-game machines and a server connected to the typing-game machines.

2. Description of Related Art

A typing-game machine offers a typing practice accompanied with game feeling. For example, Japanese Patent Unexamined Publication No. 2002-268534 discloses a certain mode of typing practice, in which a player while seeing a video image types lyrics of a song which is being played, and competes in correctness, timing, etc. of the typing.

Playing a popular song which spreads through a medium such as a CD, a DVD, a TV, etc. and at the same time displaying a video image of a promotion video (hereinafter abbreviated as PV) of the song make an advertising effect for promoting sales of the CD, DVD, etc. In this case, as more times the song is played and the PV is displayed, the more greatly the advertising effect is exerted. This is therefore an occasion to collect advertising rates from a record company to which a singer singing the song that is used for a typing game belongs.

SUMMARY OF THE INVENTION

In a typing-game machine, a large number of songs are available for a typing game, and singers singing the respective songs belong to many different record companies. Besides, the number of times used for a typing game varies from one song to another song. In addition, if advertising rates that are charged each time a song is used for a typing game are relatively low, a certain period of time is required in order to charge not a little amount of advertising rates. These factors make it troublesome to charge advertising rates in accordance with the number of times a song is used for a typing game.

An object of the present invention is to provide a typing-game machine and a database which can simplify charging advertising rates in accordance with the number of times a song is used for a typing game.

According to a first aspect of the present invention, there is provided a typing-game machine comprising a storage unit, a music playing unit, a first image display unit, a second image display unit, an input unit, a determination unit, a game course control unit, and a database making unit. The storage unit stores data associated with two or more songs. The data associated with each song has a set of a video data item and a song data item. The music playing unit plays a song based on a song data item among the song data items stored in the storage unit. The first image display unit sequentially displays, in accordance with a play of the song made through the music playing unit, a character string which is a part of lyrics of the song. The second image display unit displays a video image based on, among the video data items stored in the storage unit, a video data item associated with the song played by the music playing unit. The input unit has a plurality of keys respectively associated with a plurality of characters. The determination unit determines, based on a criterion included in a corresponding song data item, whether a character string inputted by typing keys of the input unit agrees with the character string displayed through the first image display unit or not. The game course control unit controls a course of a game based on a result of a determination made by the determination unit. The database making unit makes a database with respect to each song about the number of times a video image associated with a song is displayed through the second image display unit along with a play of the song made through the music playing unit.

According to a second aspect of the present invention, there is provided a database system including a plurality of typing-game machines and a server connected in communication with the respective typing-game machines via a network. Each of the typing-game machines comprises a storage unit, a music playing unit, a first image display unit, a second image display unit, an input unit, a determination unit, and a game course control unit. The storage unit stores data associated with two or more songs. The data associated with each song has a set of a video data item and a song data item. The music playing unit plays a song based on a song data item among the song data items stored in the storage unit. The first image display unit sequentially displays, in accordance with a play of the song made through the music playing unit, a character string which is a part of lyrics of the song. The second image display unit displays a video image based on, among the video data items stored in the storage unit, a video data item associated with the song played by the music playing unit. The input unit has a plurality of keys respectively associated with a plurality of characters. The determination unit determines, based on a criterion included in a corresponding song data item, whether a character string inputted by typing keys of the input unit agrees with the character string displayed through the first image display unit or not. The game course control unit controls a course of a game based on a result of a determination made by the determination unit. The server comprises a database making unit that makes a database with respect to each song about the number of times a video image associated with a song is displayed in each typing-game machine through the second image display unit along with a play of the song made through the music playing unit.

In these aspects, the database with respect to each song about the number of times a video image associated with a song is displayed along with a play of the song is made. Therefore, it becomes easy to collect advertising rates in accordance with the number of times a song is used for a typing game.

BRIEF DESCRIPTION OF THE DRAWINGS

Other and further objects, features and advantages of the invention will appear more fully from the following description taken in connection with the accompanying drawings in which:

FIG. 15 schematically shows an advertising-rates table that is provided in the HDD;

DESCRIPTION OF THE PREFERRED EMBODIMENTS

In the following, a certain preferred embodiment of the present invention will be described with reference to the accompanying drawings.

Figure 1:
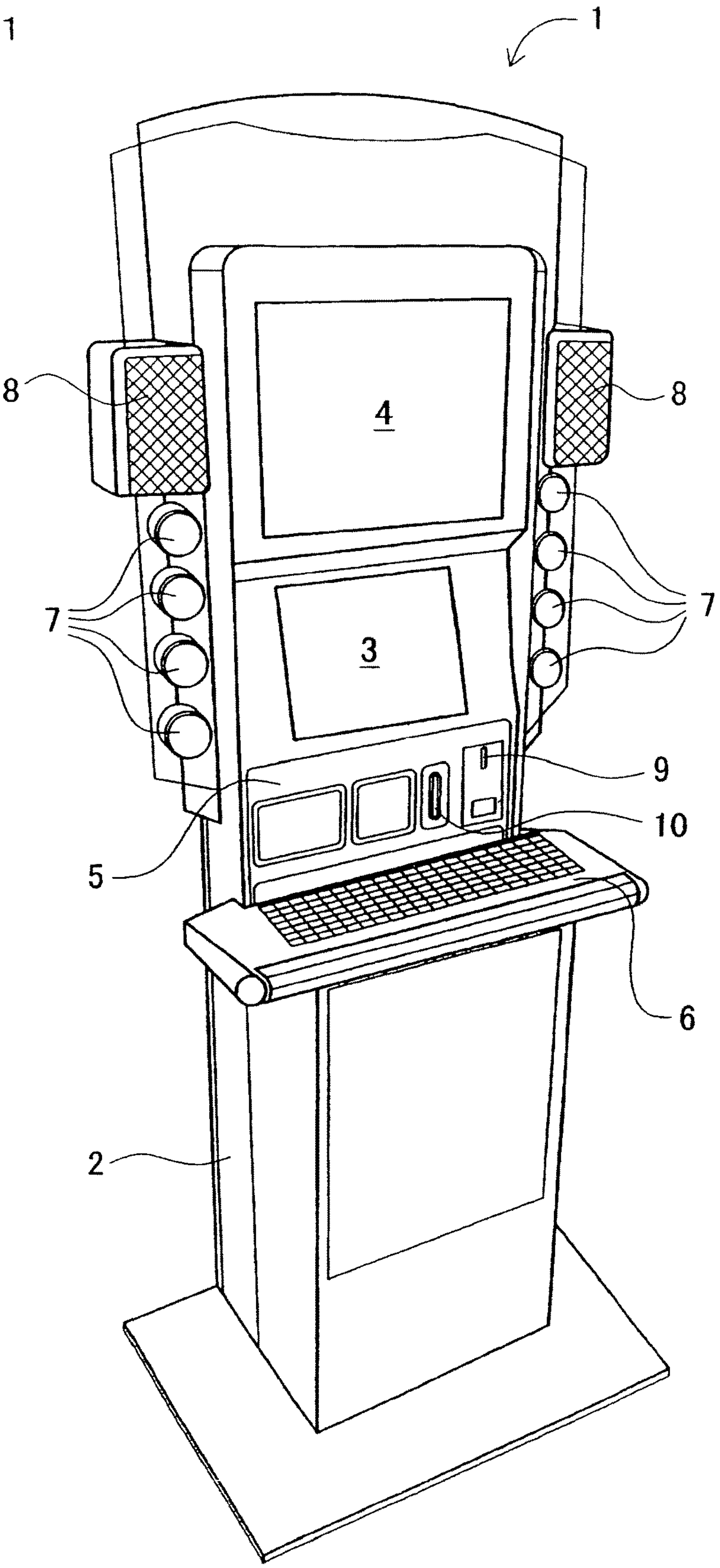
FIG. 1 is a perspective view of a typing-game machine according to an embodiment of the present invention.

A typing-game machine 1 according to this embodiment is of a cabinet type and placed in a game arcade or the like. As illustrated in FIG. 1, the typing-game machine 1 includes a cabinet 2, a main display 3, a sub display 4, a center panel 5, a keyboard 6, eight external lights 7, and a pair of speakers 8. In order to play a game in the typing-game machine 1, a player inputs lyrics of a song through the keyboard 6 while hearing the song outputted from the speakers 8 and at the same time watching the lyrics of the song displayed on the main display 3.

The main display 3 is a liquid crystal display, and disposed substantially in the middle of a front face of the cabinet 2. The main display 3 leans back at a predetermined angle. The main display 3 displays game information which concerns a progress of a game, that is, information necessary for a player to progress a game. The game information includes lyrics of a song that is outputted during a game through the speakers 8, a game result, a score associated with the game result, and the like.

The sub display 4 disposed above the main display 3 is also a liquid crystal display similarly to the main display 3. The sub display 4 displays an effect image such as a PV, an advertisement, and the like. The effect image differs from the game information displayed on the main display 3 in that the effect image is not directly involved in a progress of a game but has a supplementary function for enhancing amusement of a game. In this embodiment, while a song is being played, a singing singer is displayed on the sub display 4. This gives a typing game a sense of reality, and therefore a player does not get tired.

The center panel 5 is disposed under the main display 3, and has a coin insertion slot 9 and a card insertion slot 10. A coin such as a 100 yen coin, which is used as a charge for a game, is inserted into the coin insertion slot 9. A coin sensor 63 for detecting a coin is disposed in the coin insertion slot 9 (see FIG. 9). Thus, when a coin is inserted into the coin insertion slot 9, the coin sensor 63 outputs a detection signal to a CPU 51.

An IC card (not illustrated) is inserted into the card insertion slot 10. The IC card has an IC tag. The IC tag stores results of games previously played by an owner of this IC card, in more detail, scores, points, etc., previously marked by the owner. A card sensor 64 and a card reader/writer 65 are disposed in the card insertion slot 10 (see FIG. 9). The card sensor 64 detects an IC card inserted into the card insertion slot 10. The card reader/writer 65 reads and writes data out of and into the IC tag of the IC card.

The keyboard 6 is disposed on the front face of the cabinet 2 in such a manner as to protrude frontward. The keyboard 6 is operated in order to select a song and a game level before a game is started, and also operated in starting a game and during a game.

Four of the external lights 7 are disposed on the right side of the main display 3, and four of them are disposed on the left side of the main display 3. The external lights 7 include full-color LEDs capable of emitting full-color lights, so that they produce various lighting effects in accordance with a song which is being played. The lighting effects include, for example, simultaneously changing light colors emitted from all the eight external lights 7, changing light colors based on a regular rule, turning on and off the external lights 7, and the like.

The speakers 8 are disposed on right and left sides of the sub display 4, and outputs songs and effect sounds. To be more specific, during a game the speakers 8 outputs accompaniment and singing voice at a predetermined tempo, based on accompaniment data and singing voice data stored in the HDD (see FIG. 9).

Next, a description will be given to contents of displays shown on the main display 3 and the sub display 4. The contents of displays include three patterns, i.e., a pre-game pattern, an in-game pattern, and an after-game pattern.

Figure 2:
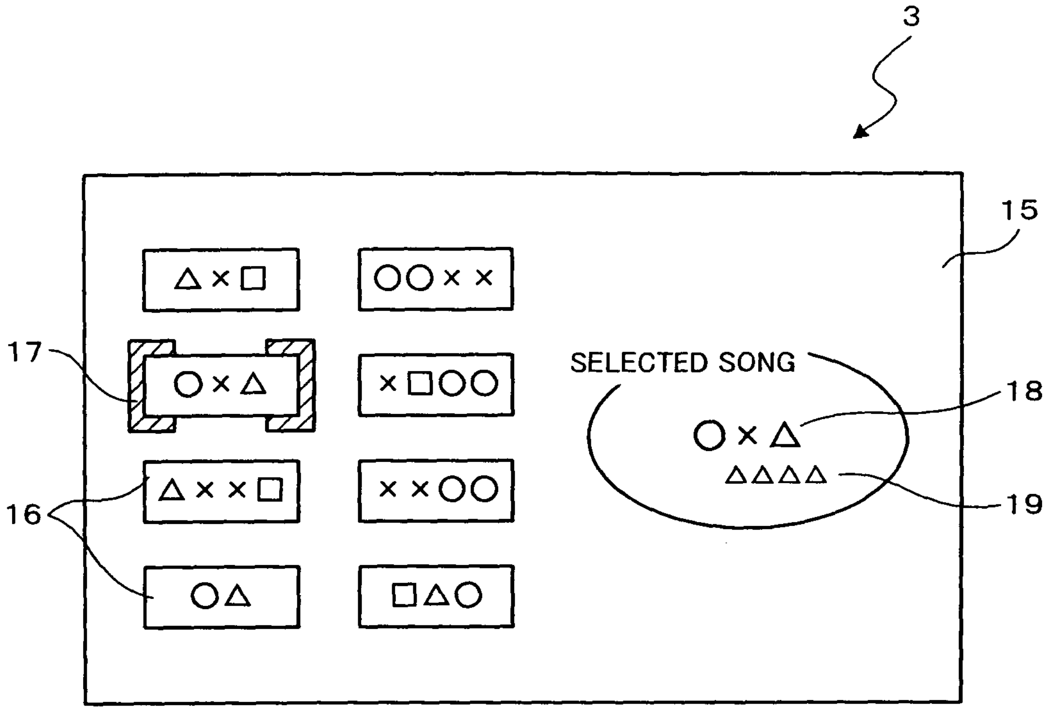
FIG. 2 schematically shows what is displayed on a main display before a game is started.

With reference to FIG. 2, a description will be given to what is displayed in a case where a coin/coins of a predetermined amount is/are inserted into the coin insertion slot 9 but a game is not started yet. The main display 3 displays a song selection screen 15. The song selection screen 15 has a song title indicator 16, a cursor 17, a selected song indicator 18, and a singer name indicator 19. While the main display 3 is displaying the song selection screen 15, the sub display 4 may display a PV, an advertisement, etc., of an arbitrary song.

The song title indicator 16 indicates titles of songs available for a game in the typing-game machine 1. By operating cursor keys 114 of the keyboard 6 (see FIG. 6), the cursor 17 can be moved over the song title indicator 16 in vertical and horizontal directions. The selected song indicator 18 indicates a title of a song which is currently pointed by the cursor 17, and the singer name indicator 19 indicates a name of a singer of a song which is currently pointed by the cursor 17. When an enter key 112 (see FIG. 6) is pressed with the cursor 17 pointing a song, a song used for a game is determined and a typing game starts.

Figure 8:
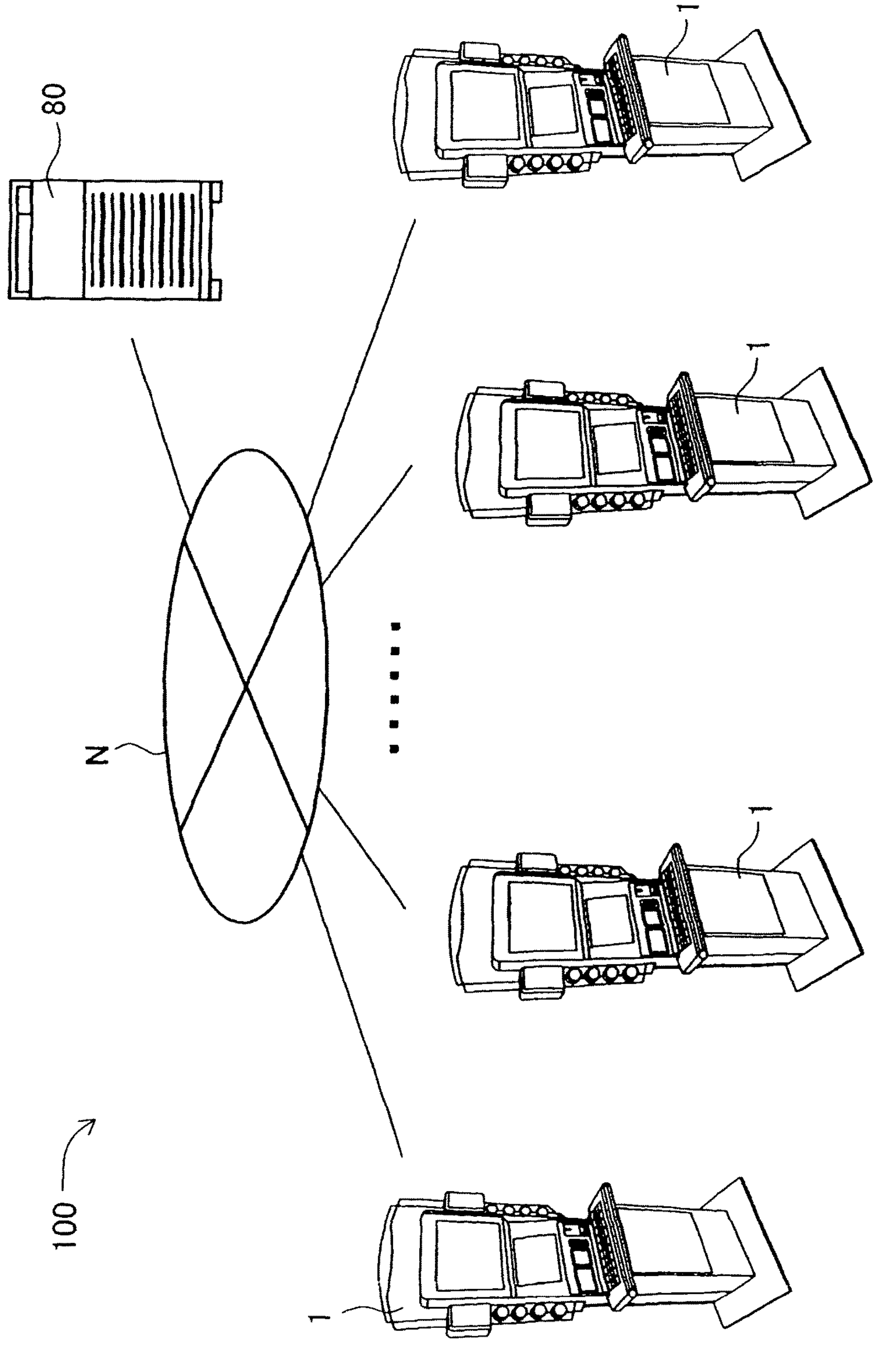
FIG. 8 is a block diagram showing a game system including many typing-game machines and a server that is connected in communication with the respective typing-game machines.

FIG. 8 shows a game system 100 including the typing-game machines 1. In the game system 100, each of the typing-game machines 1 is connected in communication with a server 80 through a network N that is capable of two-way communication, e.g., through an internet. Data associated with songs stored in the HDD 55 of the typing-game machine 1 (see FIG. 9) are updated by downloading data from the server 80. Accordingly, songs available for a game on the typing-game machine 1 can be changed, and thus a player can play a game using a latest song. Further, according to the game system 100, since the server 80 manages all of the many typing-game machines 1 placed in a game shop, updating of data can easily be done.

With reference to FIGS. 3A, 3B, 4A, and 4B, a description will be given to what is displayed during a game. During a game, the main display 3 displays a main game screen 21 which concerns a progress of a game, and the sub display 4 displays a PV 20 of the song selected.

Each song used for a game is made up of some pieces, i.e., some stages. Each of the some stages includes some phrases of lyrics of a song. A game starts with a first stage in which a user, while hearing a song, sequentially inputs characters of phrases included in this stage. If a later-described predetermined requirement is satisfied at the end of this stage, the user is allowed to proceed to a next stage.

The main game screen 21 includes a lyrics indicator 22, a result-of-input indicator 23, a stage-number/phrase-number indicator 25, a game result indicator 26, a record indicator 27, and a singer-name/song-title indicator 28.

Figure 3A:
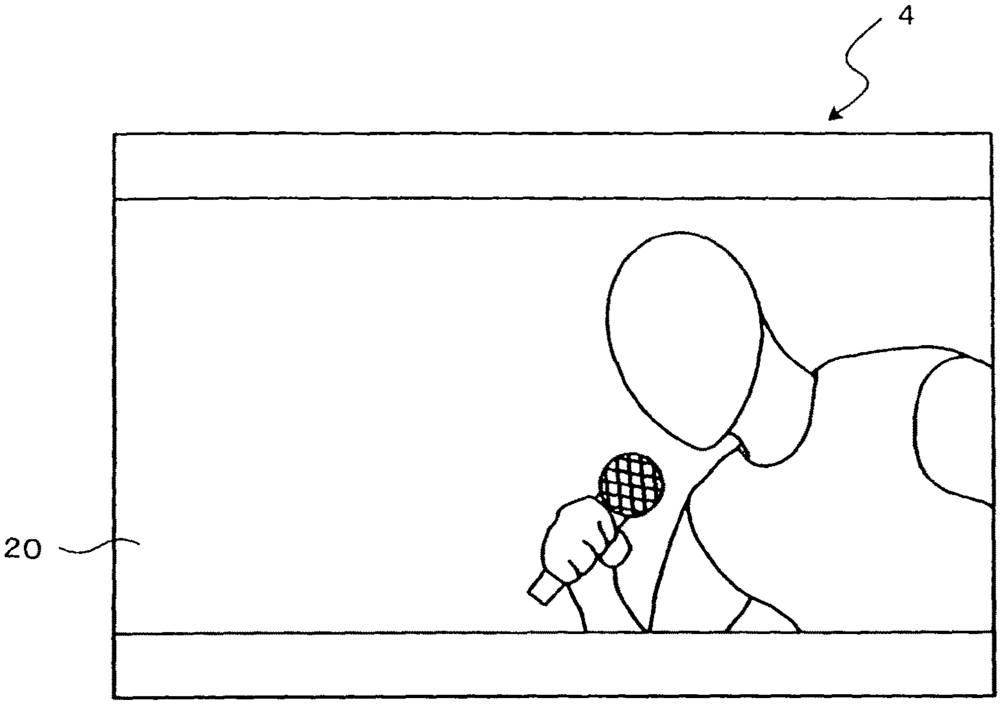
FIGS. 3A and 3B schematically show what are displayed during a game on a sub display and the main display of the typing-game machine, respectively, if a song of a male singer is selected.
Figure 3B:
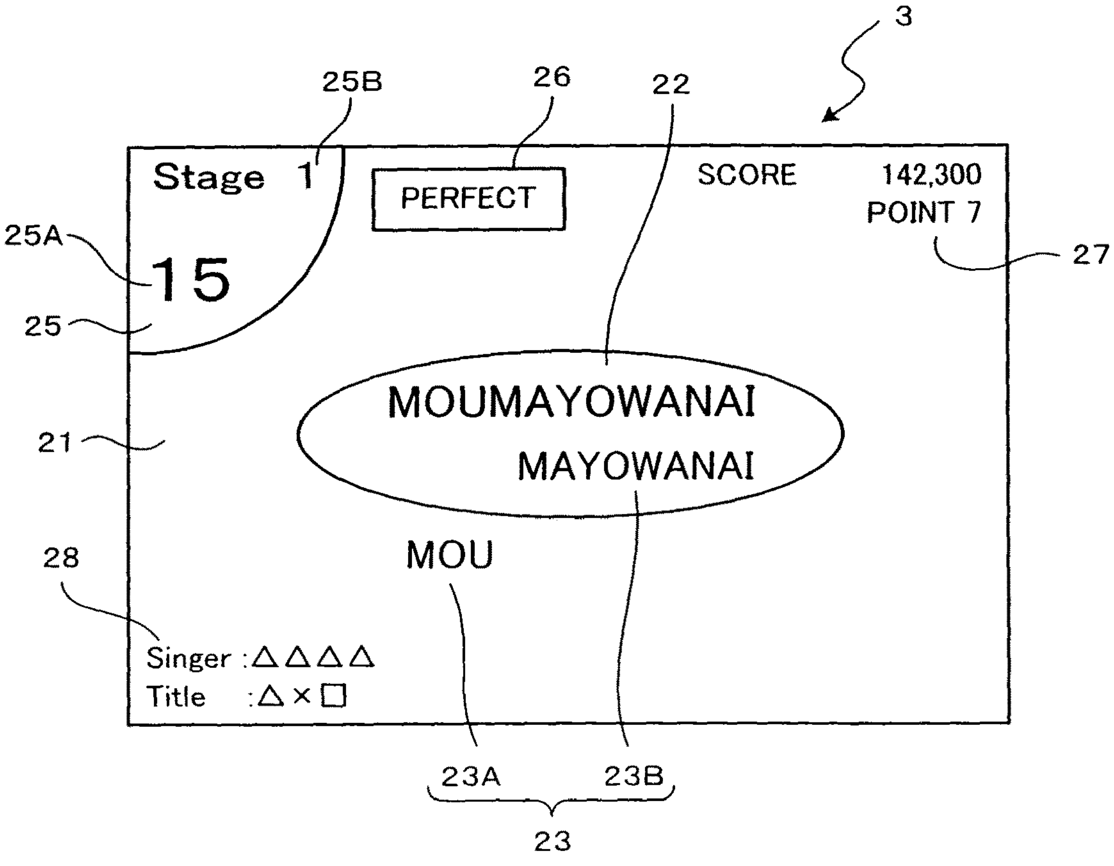
Figure 4A:
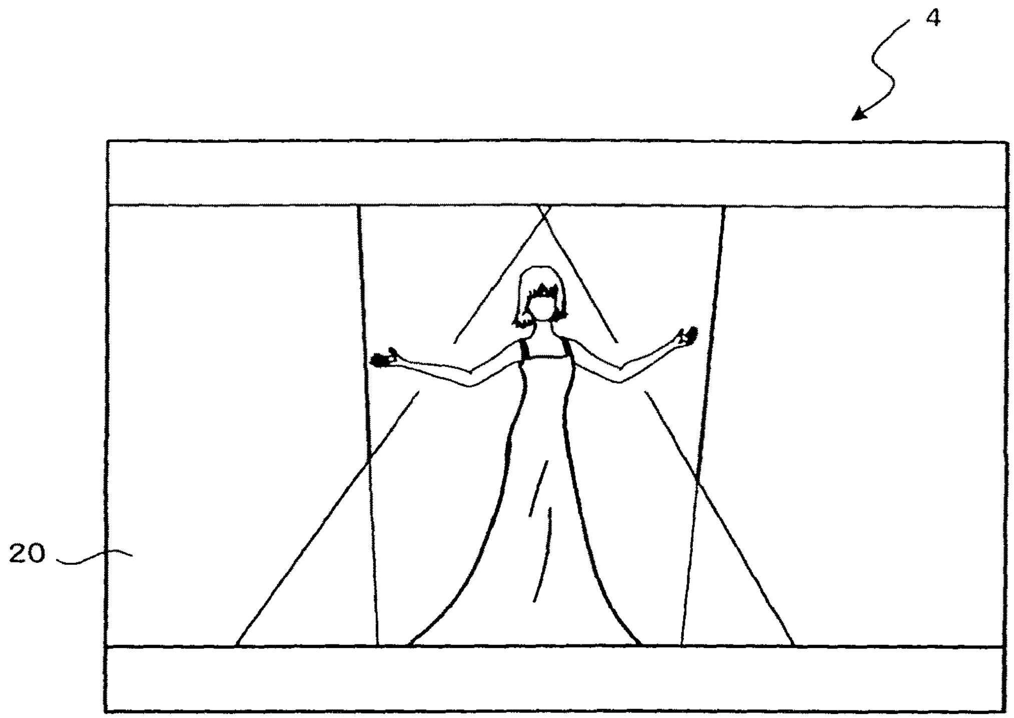
FIGS. 4A and 4B schematically show what are displayed during a game on the sub display and the main display of the typing-game machine, respectively, if a song of a female singer is selected.
Figure 4B:
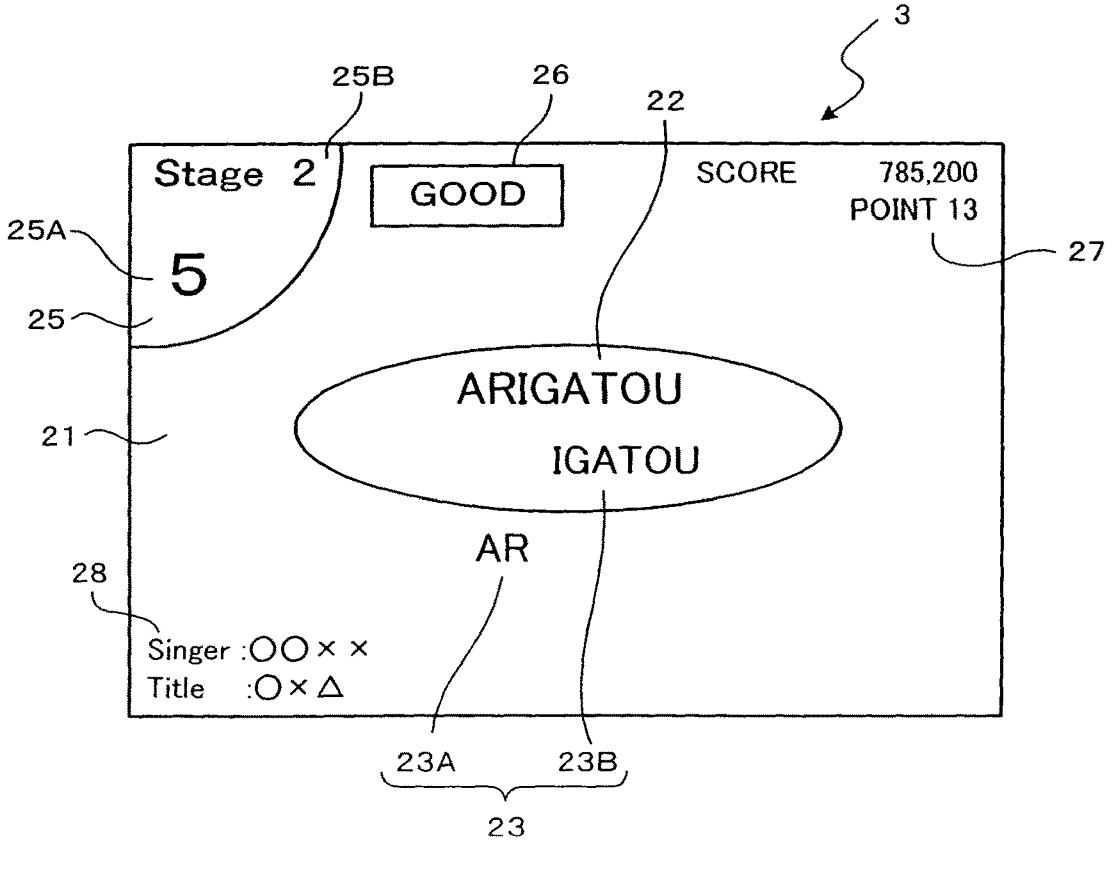

The lyrics indicator 22 indicates, along with a play of a song currently used for the game, a character string corresponding to one phrase of lyrics of the song. In FIGS. 3B and 4B, the character string is designated in Japanese using Roman characters. A player makes typing using the keyboard 6 in accordance with a character string indicated by the lyrics indicator 22.

The result-of-input indicator 23 indicates a character string 23A and a character string 23B. The character string 23A is a string of characters which have already been inputted by a player among characters indicated by the lyrics indicator 22. The character string 23B is a string of characters which have not been inputted yet. The character string 23A lets a player know which characters he/she has already inputted.

The stage-number/phrase-number indicator 25 has a stage-number indicator 25B and a phrase number indicator 25A. The stage-number indicator 25B indicates an ordinal number of a stage to which a phrase currently indicated by the lyrics indicator 22 belongs. The phrase number indicator 25A indicates an ordinal number, within each stage, of a phrase currently indicated by the lyrics indicator 22. For example, if a song includes three pieces, there exist first, second, and third stages. FIG. 3B illustrates that a phrase currently indicated by the lyrics indicator 22 is the 15th phrase of the first stage, and FIG. 4B illustrates that a phrase currently indicated by the lyrics indicator 22 is the 5th phrase of the second stage.

Every time a player finishes inputting one phrase, a value indicated by the phrase number indicator 25A increases by one. Every time a player finishes inputting all phrases included in one stage, a value indicated by the stage number indicator 25B increases by one. The stage-number/phrase-number indicator 25 lets a player know a stage number and a phrase number he/she currently participates in.

The game result indicator 26 indicates correctness of the typing. If a player has inputted correct characters in time with singing voice, the game result indicator 26 indicates "PERFECT". If a player has inputted correct characters not in time with singing voice, the game result indicator 26 indicates "GOOD". If a player has inputted incorrect characters, the game result indicator 26 indicates "MISS" irrespective of timing of the input.

The record indicator 27 indicates a score and points which have been marked by a player until now. If a player has correctly inputted characters in accordance with a character string indicated by the lyrics indicator 22, a score is added. If this input was done in time with singing voice, an additional score is further added. If a player has inputted all characters included in one phrase without any mistake, one point is added.

The song information indicator 28 indicates a title of a song which is being used for a game and a name of a singer who sings the song.

Figure 5:
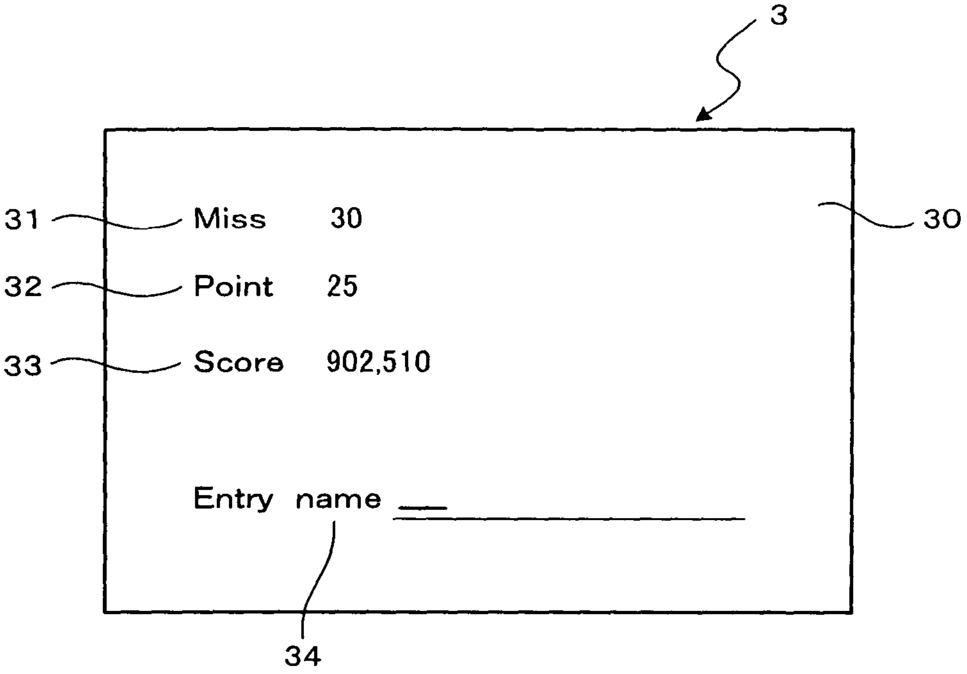
FIG. 5 schematically shows what is displayed on the main display after a game is finished.

With reference to FIG. 5, a description will be given to what is displayed after a game is finished. The main display 3 displays a game result screen 30 showing a result of the last game. The game result screen 30 includes a number-of-misses indicator 31, an acquired-point indicator 32, a marked-score indicator 33, and a name-input indicator 34. The number-of-misses indicator 31 indicates the number of mistypings made in the last game. The acquired-point indicator 32 and the marked-score indicator 33 indicate a point acquired and a score marked, respectively.

The game result screen 30 lets a player know the number of misses made in the last game, a point acquired in the last game, and a score marked in the last game. When a player inputs his/her name through the keyboard 6 while the main display 3 is displaying the game result screen 30, the inputted name is indicated by the name-input indicator 34. If the score reaches a predetermined value or higher, the name and the score are entered on a ranking, and ranking data that are stored in a RAM 54 (see FIG. 9) are updated.

While the main display 3 is displaying a game result screen 30, the lyrics of the song used for the last game may be scrolled upward on the sub display 4. At this time, a part of the lyrics where mis-input has occurred may be underlined. Alternatively, the sub display 4 may display a PV, an advertisement, etc., of an arbitrary song.

Next, the keyboard 6 will be described with reference to FIGS. 6 and 7.

Figure 6:
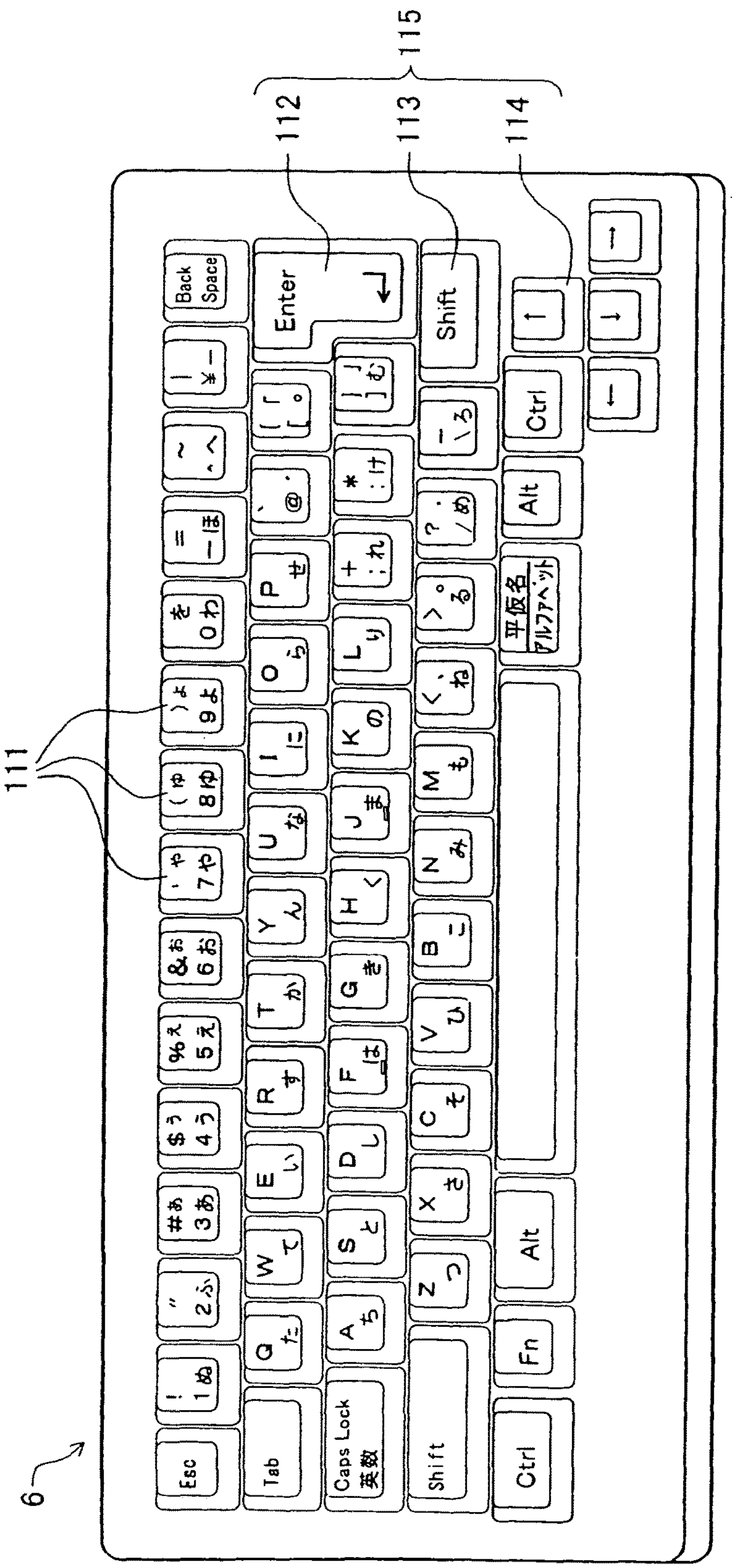
FIG. 6 is a plan view of a keyboard of the typing-game machine.

As illustrated in FIG. 6, the keyboard 6 is a Japanese 108 keyboard on which character input keys 111 and function keys 115 are arranged. The character input keys 111 are for inputting characters of "A to Z (alphabets)", "A to N (kanas), "0 to 9 (figures)", and marks such as ". (period)", ", (comma)", etc. The function keys 115 include an enter key 112, a shift key 113, cursor keys 114, etc. Here, in FIG. 6, actual Japanese kana characters are shown. A player operates the character input keys 111 during a game, and operates the function keys 115 in order to start a game, in order to select a song and a game level before starting a game, and the like.

Figure 7:
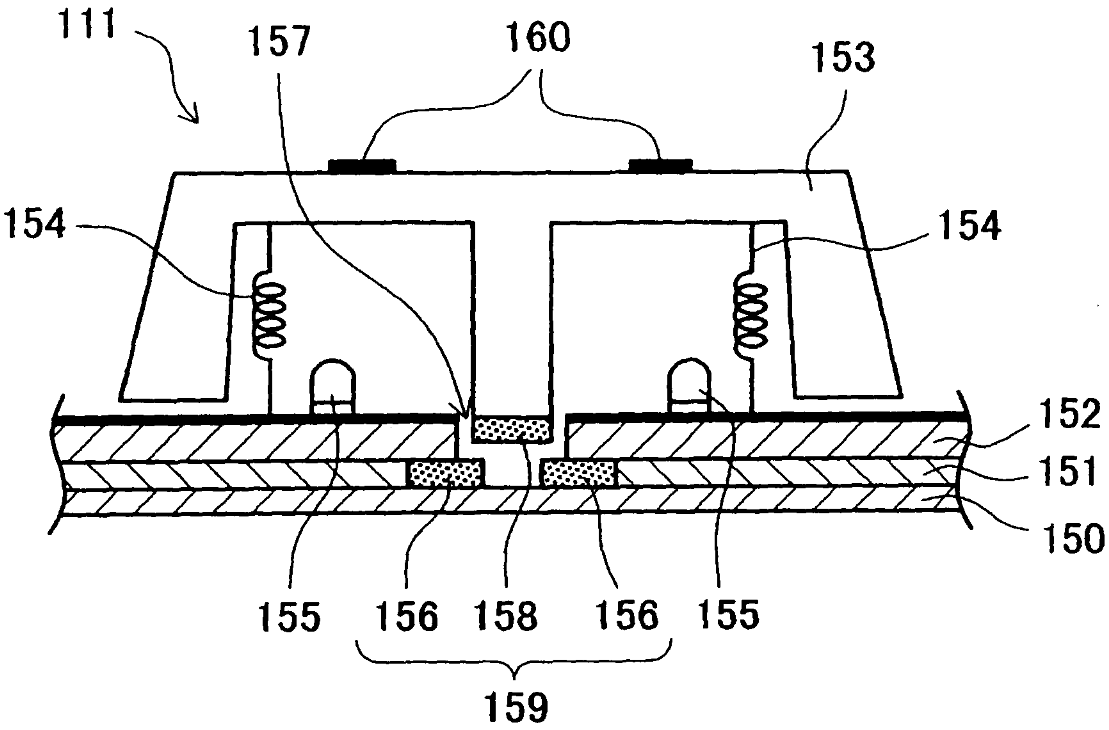
FIG. 7 is a sectional view of a key that is arranged on the keyboard.

Each of the keys of the keyboard 6 has an internal structure shown in FIG. 7. FIG. 7 shows a character input key 111 as an example, but the other function keys 115 have the same structure and therefore a specific description thereof will be omitted here.

As shown in FIG. 7, each of the keys of the keyboard 6 has a base plate 150, a switching circuit board 151, a light-emitting circuit board 152, a key top 153, a biasing mechanism 154, and a full-color LED 155. The biasing mechanism 154 is disposed between the light-emitting circuit board 152 and a top wall of the key top 153, so that the biasing mechanism 154 biases the key top 153 upward to be away from the switching circuit board 151. The biasing mechanism 154 is not limited to one having only an elastic member as shown in FIG. 7, but may be one having an elastic member and a bridge mechanism.

The switching circuit board 151 disposed on the base plate 150 has a pair of electrodes 156 that correspond to a center of the key top 153. The light-emitting circuit board 152 disposed on the switching circuit board 151 has an opening 157 for exposing the electrodes 156. The key top 153 has an extending portion that extends from a center of the top wall of the key top 153 toward the opening 157. An electrode 158 is provided at a front end of the extending portion so that it may confront the electrodes 156. The full-color LED 155 is disposed on the light-emitting circuit board 152 and around the opening 157.

A key switch 159, which is made up of the electrodes 156 and 158, is connected to a signaling circuit (not shown) provided on the switching circuit board 151. The signaling circuit is connected through an interface unit 52 (hereinafter referred to as "I/O") to the CPU 51 of the typing-game machine 1 (see FIG. 9). When the key top 153 is pressed down, the electrode 158 of this key top 153 comes into contact with the electrodes 156 and a press-down signal is transmitted from the key switch 159 through the signaling circuit to the CPU 51. The CPU 51 thereby identifies which key is pressed down, and controls for executing an operation corresponding to this key.

The key top 153 is made of a translucent material such as transparent acryl, a transparent plastic, etc. On an upper face of the key top 153, key information 160 such as a character, a figure, a mark, etc., is printed with black color. An upper face of the light-emitting circuit board 152 is also printed with black. Accordingly, while the full-color LED 155 is turned off, the key information 160 is not much seeable because it fades into the black upper face of the light-emitting circuit board 152. While the full-color LED 155 is turned on, the black key information 160 can easily be seen because the translucent key top 153 reflects a lighting color of the full-color LED 155.

Figure 9:
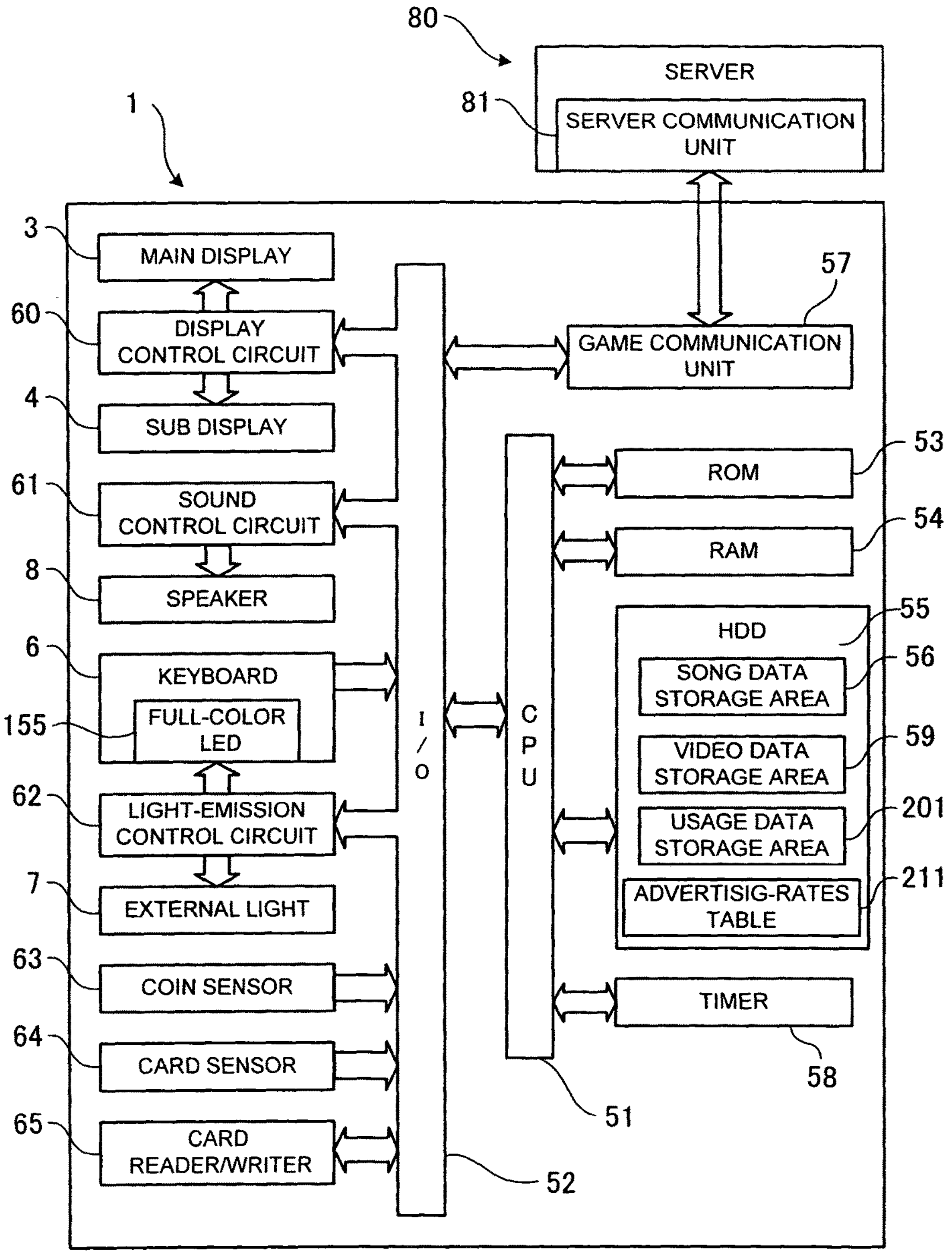
FIG. 9 is a block diagram showing a control unit of the typing-game machine.

The full-color LED 155 is connected to a light-emission control circuit 62 that is connected through the I/O 52 to the CPU 51 (see FIG. 9). The light-emission control circuit 62 causes the full-color LED 155 to light with a color determined by the CPU 51. For example, if it is determined that a correct character has been inputted, the light-emission control circuit 62 causes a character input key 111 which has been pressed down to emit a blue light. If it is determined that an incorrect character has been inputted, the light-emission control circuit 62 causes a character input key 111 which has been pressed down to emit a red light and a correct key which should have been pressed down to emit a green light, respectively. If no character has been inputted, the light-emission control circuit 62 causes a correct key which should have been pressed down to emit a green light.

Next, a control unit of the typing-game machine 1 will be described with reference to FIG. 9.

As shown in FIG. 9, the control unit includes a CPU 51, a ROM 53, a RAM 54, an HDD 55, a timer 58, and peripheral equipments. The ROM 53, the RAM 54, the HDD 55, and the timer 58 are connected to the CPU 51. The peripheral equipments are connected through the I/O 52 to the CPU 51.

The CPU 51 is a central processing unit that executes computations in accordance with various commands. The I/O 52 electrically connects, to the CPU 51, the main display 3, the sub display 4, the keyboard 6, the external lights 7, the speakers 8, and the like. The ROM 53 is a non-volatile read-only memory that stores a computation program for executing a later-described flowchart, etc. The RAM 54 is a memory for temporarily storing data computed out by the CPU 51, and stores the number of mistypings made, a score, a point, etc. Further, the RAM 54 temporarily stores, among data stored in the HDD 55, data about lyrics of a song used for a game. The lyrics stored in the RAM 54 are divided on a phrase basis.

The HDD 55 is a storage device that stores data associated with songs available for games in the typing-game machine 1. The data associated with each song has a set of a video data item and a song data item. Each of the video data items is data concerning a PV 20 of a song (see FIGS. 3A and 4A), and stored in a video data storage area 59 formed within the HDD 55. Each of the song data items includes accompaniment data, singing voice data, lyrics data, criterion data, LED lighting pattern data, keyboard lighting pattern data, and term data. These data are stored in a song data storage area 56 that is formed within the HDD (see FIG. 10).

The HDD 55 is capable of storing data of eight songs. Both the video data storage area 59 and the song data storage area 56 have first to eighth storage areas for respectively storing data of eight songs. That is, a video data item and a song data item for each song are stored in a corresponding storage area of the video data storage area 59 and the song data storage area 56, respectively.

Figure 10:
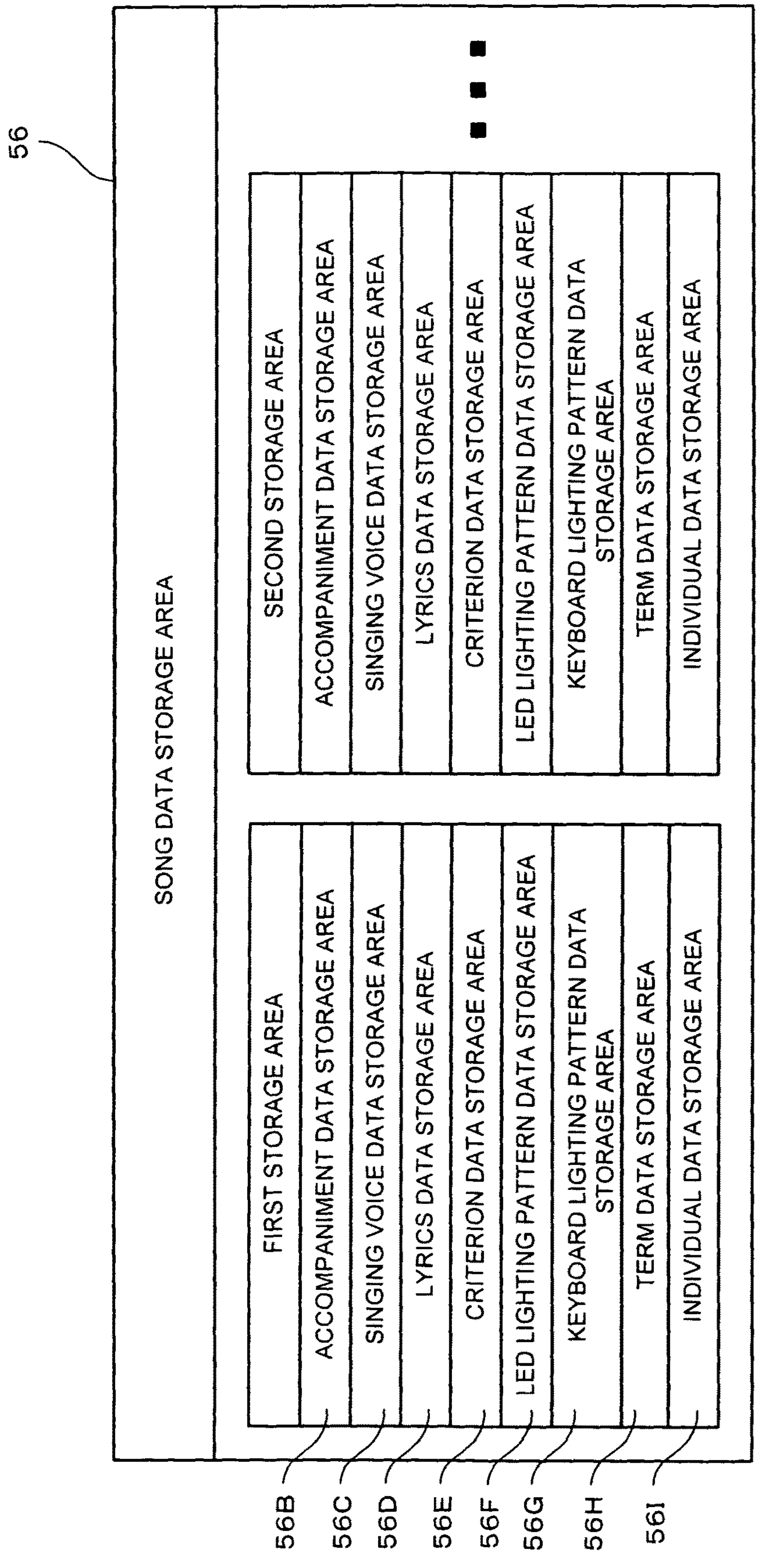
FIG. 10 schematically shows a song data storage area of an HDD that is included in the control unit.

Here, the song data storage area 56 will be more detailed with reference to FIG. 10.

Each of the first to eighth storage areas, which are formed within the song data storage area 56, includes an accompaniment data storage area 56B, a singing voice data storage area 56C, a lyrics data storage area 56D, a criterion data storage area 56E, an LED lighting pattern data storage area 56F, a keyboard lighting pattern data storage area 56G, a term data storage area 56H, and an individual data storage area 56I.

The accompaniment data storage area 56B stores instrumental accompaniment data concerning a song which is outputted from the speakers 8. The singing voice data storage area 56C stores data concerning singing voice which is outputted from the speakers 8. The lyrics data storage area 56D stores lyrics data concerning lyrics of a song.

The criterion data storage area 56E stores criterion data concerning a criterion for determination about correctness of a typing. Here, the correctness of a typing means correctness of an inputted character and correctness of an input timing. The LED lighting pattern data storage area 56F stores LED lighting pattern data for lighting the external lights 7. The keyboard lighting pattern data storage area 56G stores keyboard lighting pattern data for lighting the full-color LEDs 155 that are provided inside the keys. Lighting patterns of the full-color LEDs 155 include one which assists a player in typing by means of sequentially lighting a series of keys which should be pressed down with a light color different from a light color of the other keys, one which changes light colors of all the keys arranged on the keyboard 6 so as to match with impression given by a song, and the like.

The term data storage area 56H stores term data concerning an expiration date of the data associated with a song. The term data include two kinds of data, one about a start date of using the data of a song and one about an end date of using the data. To be more specific, the start date is a date on which the data is transmitted from the server 80 (see FIG. 8) and gets available in the typing-game machine 1, and the end date is a date after a predetermined period of time elapses from the start date. Based on data obtained from the timer 58 (see FIG. 9) and the term data stored in the term data storage area 56H, the CPU 51 manages expiration dates of data associated with respective songs so that an expired data may not be used for a game.

The individual data storage area 56I stores a name of a record company to which a singer singing a corresponding song belongs, a title of the song, a name of the singer, and the like.

Next, a usage data storage area 201 formed within the HDD 55 (see FIG. 9) will be described in detail with reference to FIG. 14.

Figure 14:
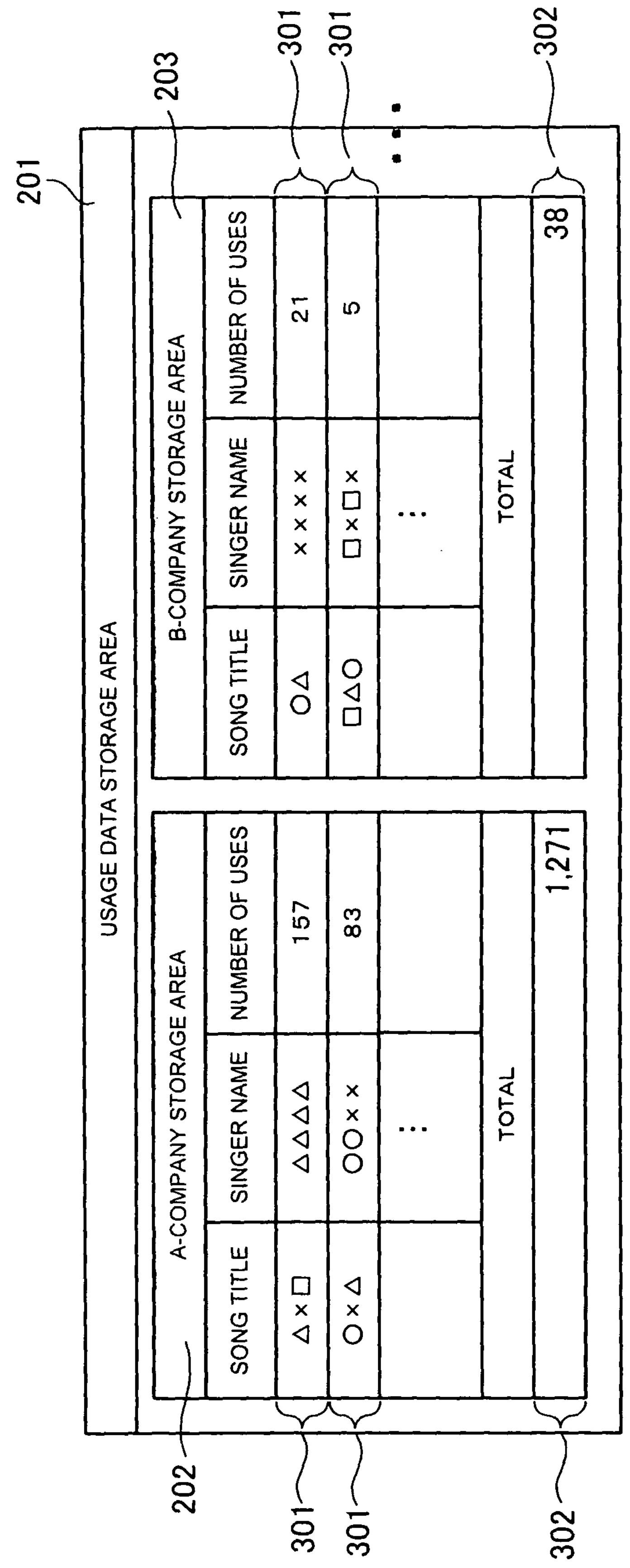
FIG. 14 schematically shows a usage data storage area of the HDD that is included in the control unit.

As shown in FIG. 14, the usage data storage area 201 includes storage areas 202, 203, . . . , which are assigned to respective record companies to which singers singing the available songs belong. An A-Company storage area 202, a B-Company storage area 203, . . . , respectively have many data areas 301 each given to a block of a SONG TITLE data field, a SINGER NAME data field, and a NUMBER OF USES data field.

When a song is used for a game, a value "1" is added to a value stored in a NUMBER OF USES data field of a data area 301 whose SONG TITLE data and SINGER NAME data match with a title of the song used and a name of a singer singing the song used, respectively. If there is no data area 301 having its SONG TITLE data and SINGER NAME data matching with a title of the song used and a name of a singer singing the song used, respectively, a new data area 301 is created. The title of the song used and the name of the singer singing the song used are recorded on a SONG TITLE data field and a SINGER NAME data field of the new data area 301, and besides a value "1" is written into a NUMBER OF USES data field of the new data area 301. If the usage data storage area 201 has no storage area assigned to a record company to which the singer singing the song used belongs, a new storage area is created and assigned to this company, followed by the above-described processing.

Determinations on record company name, song title, and singer name are made by reading out, from the song data storage area 56 of the HDD 55 (see FIG. 10), data that are stored in the individual data storage area 56I of a corresponding song.

Each of the storage areas formed within the usage data storage area 201 and assigned to respective record companies (the A-Company storage area 202, the B-Company storage area 203, . . . in FIG. 14) includes a TOTAL data field 302. The TOTAL data field 302 stores a total of values stored in the NUMBER OF USES data fields of the respective data areas 301. Accordingly, the usage data storage area 201 functions as a database with respect to each song about the number of times a song is used for a typing game. The data on the database are separated for every company to which a singer singing a song belongs.

Next, an advertising-rates table 211 provided in the HDD 55 (see FIG. 9) will be described in detail with reference to FIG. 15.

As shown in FIG. 15, the advertising-rates table 211 has many data areas 401 each given to a block of a NUMBER OF USES data field and an ADVERTISING RATES data field. A NUMBER OF USES data field and an ADVERTISING RATES data field in each data area 401 store values which make a correspondence with each other. In the advertising-rates table 211, for example, when the number of uses is more than 2000 advertising rates corresponding thereto are "Δooooo", and when the number of uses is 1400 to 1999 advertising rates corresponding thereto are "□oooo".

A value stored in a NUMBER OF USES data field of the advertising-rates table 211 corresponds to "the total number of times songs of singers belonging to the same record company are used for typing games", that is, corresponds to a value stored in a TOTAL data field 302 included in each storage area (in each of the A-Company storage area 202, the B-Company storage area 203, . . . in FIG. 14) that is formed within the usage data storage area 201 of the HDD 55 shown in FIG. 9.

The advertising-rates table 211 can be updated based on data transmitted from the server 80.

Referring to FIG. 9 again, the other peripheral equipments included in the control unit will be described.

A game communication unit 57 converts a signal sent out from the typing-game machine 1 into a transmittable form according to a communication type such as a telephone network, a LAN cable, etc., and then sends the signal thus converted to the server 80. Also, the game communication unit 57 converts a signal sent from the server 80 into a form readable by the typing-game machine 1, and then receives the signal thus converted. The game communication unit 57 is connected to a server communication unit 81 of the server 80 through a network N capable of two-way communication, e.g., through an internet (see FIG. 8).

A display control circuit 60 is connected through the I/O 52 to the CPU 51, and controls contents of displays on the main display 3 and the sub display 4 in accordance with results of computing processing executed by the CPU 51. The display control circuit 60 includes a program ROM, an image ROM, an image control CPU, a work RAM, a VDP (Video Display Processor), a video RAM, and the like. The program ROM stores an image control program, various selection tables, etc., which concern displays made on the main display 3 and the sub display 4. The image ROM stores dot data used for forming images such as a song selection screen 15 (see FIG. 2), a main game screen 21 (see FIGS. 3B and 4B), a game result screen 30 (see FIG. 5), which are displayed on the main display 3. Based on a parameter defined by the CPU 51 and in accordance with the image control program stored in the program ROM, the image control CPU determines, from the dot data stored in the image ROM, which image will be displayed on the main display 3 and the sub display 4. The VDP forms an image that corresponds to display contents determined by the image control CPU, and outputs the image to the main display 3 or the sub display 4.

A sound control circuit 61 is connected through the I/O 52 to the CPU 51, and also connected to the speakers 8. When a game is started and a song data item associated with a selected song is read out of the song data storage area 56 of the HDD 55, accompaniment data and singing voice data included in the song data item are converted into a tone signal by the sound control circuit 61 and then outputted through the speakers 8.

A light-emission control circuit 62 is connected through the I/O 52 to the CPU 51, and also connected to the external lights 7 (see FIG. 1) and to the full-color LEDs 155 disposed inside the keys (see FIG. 7). When a song data item associated with a selected song is read out of the song data storage area 56 of the HDD 55, the light-emission control circuit 62 controls the external lights 7 and the full-color LEDs 155 based on LED lighting pattern data and keyboard lighting pattern data included in the song data item.

Figure 11:
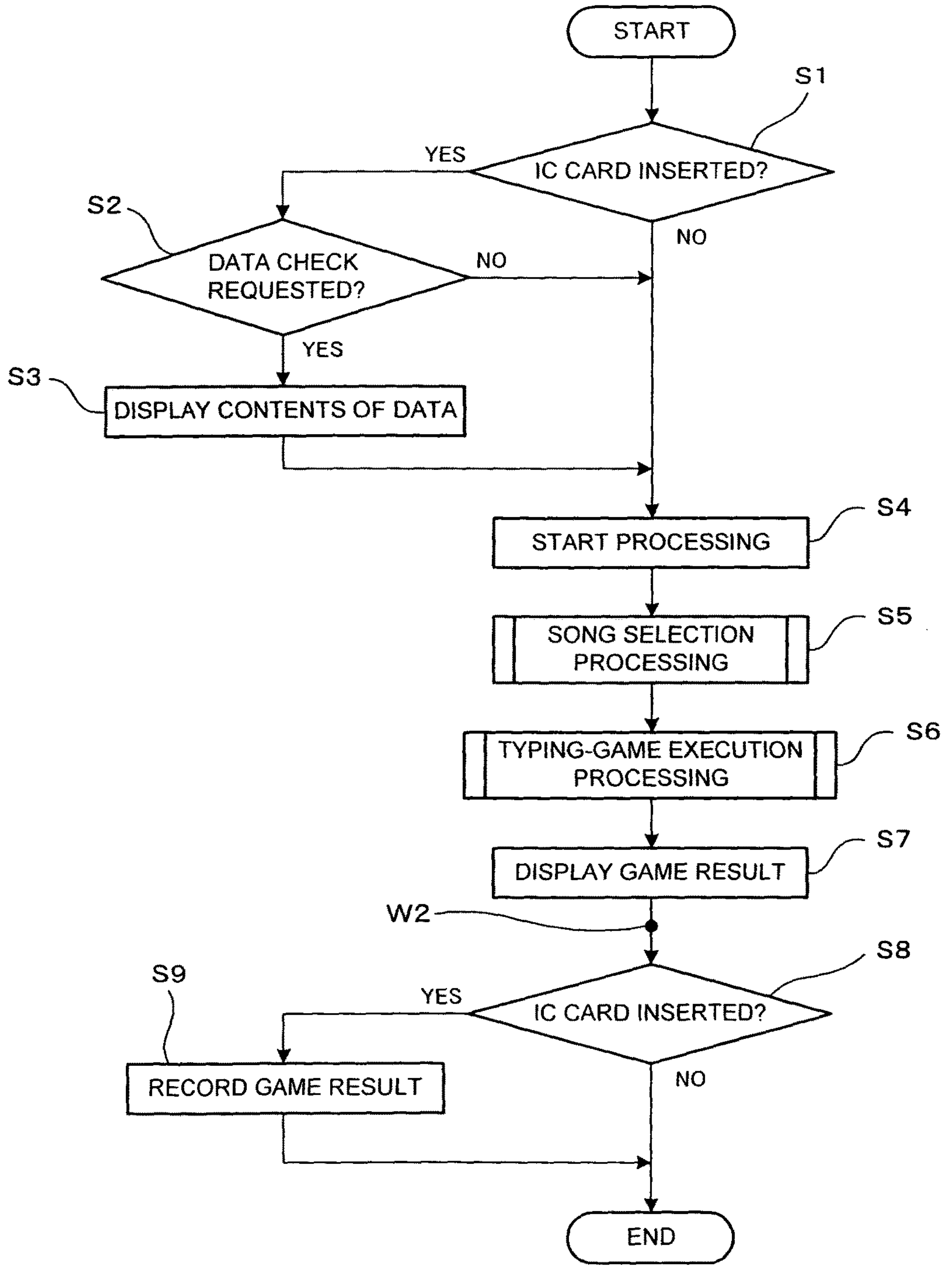
FIG. 11 shows a flowchart of a main processing that is executed in the typing-game machine.
Figure 12:
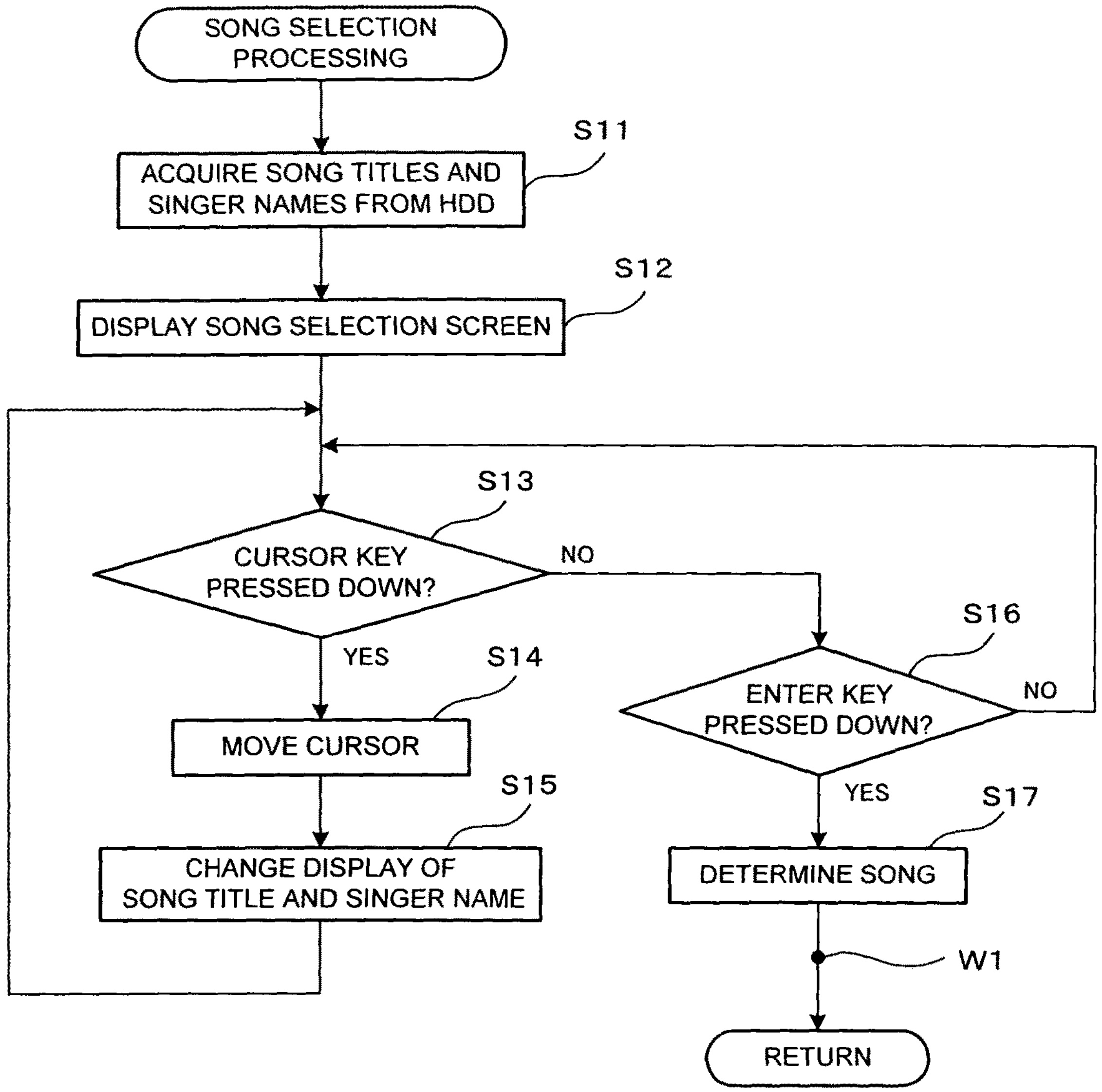
FIG. 12 shows a flowchart of a song selection processing that is included in the main processing.
Figure 13:
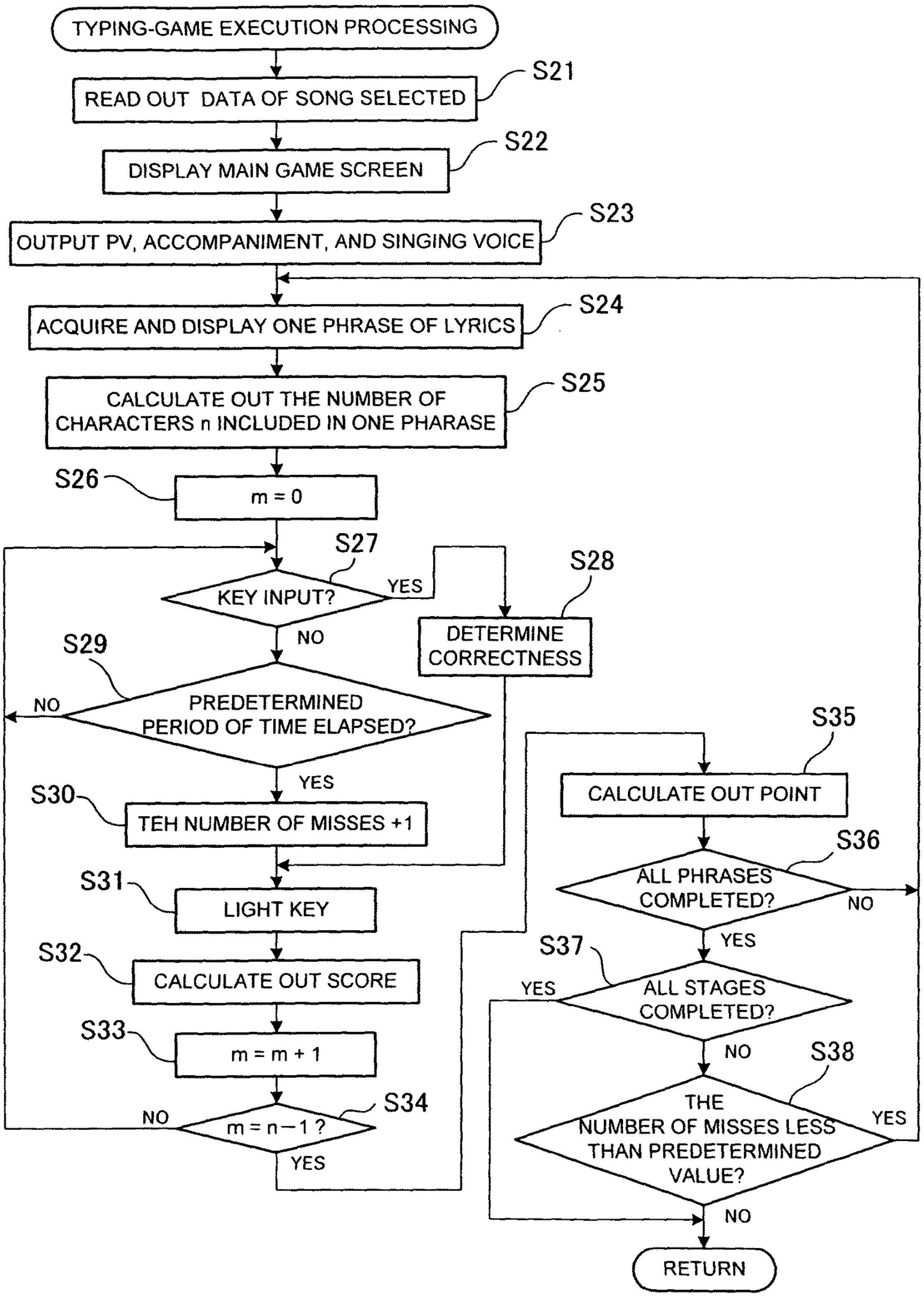
FIG. 13 shows a flowchart of a typing-game execution processing that is included in the main processing.

Next, processings executed in the typing-game machine 1 will be described with reference to FIGS. 11, 12, and 13. Programs of the processings shown in FIGS. 11 to 13 are stored in the ROM 53 or RAM 54, and the CPU 51 executes these programs.

A description will be given to a main processing shown in FIG. 11.

First, whether an IC card is inserted in the card insertion slot 10 or not is determined based on a detection signal sent from the card sensor 64 (S1). If it is determined that an IC card is inserted (S1: YES), whether a player requests a data check or not is determined (S2). If it is determined that an IC card is not inserted (S1: NO), the processing proceeds to S4.

If it is determined that a player requests a data check (S2: YES), contents of the data are displayed on the main display 3 (S3). More specifically, the card reader/writer 65 reads out data stored in an IC tag of the IC card about results of games previously played by the owner of this IC card. Then, the results of games are listed on the main display 3. By, for example, pressing down a shift key 113 of the keyboard 6, a player can request a data check and check results of previous games.

In S4, a start processing is executed. Specifically, whether a predetermined amount of coins, e.g., for 200 yen, are inserted into the coin insertion slot 9 or not is determined based on a detection signal sent from the coin sensor 63. If it is determined that a predetermined amount of coins are inserted, the processing proceeds to S5.

When a predetermined amount of coins are not yet inserted during the start processing S4, and when the typing-game machine 1 is in a stand-by state holding no player, the sub display 4 and/or the main display 3 displays a demonstration screen including a demo-play game, a PV of an arbitrary song, an advertisement, a list of ranking data, and the like.

In S5, a song selection processing shown in FIG. 12 is executed. In the song selection processing, as will be detailed later, the main display 3 displays a song selection screen 15 (see FIG. 2) based on the song data item stored in the song data storage area 56 of the HDD 55, so that a song used for a game is determined.

In S6, a typing-game execution processing shown in FIG. 13 is executed based on a song determined in S5. In the typing-game execution processing, as will be detailed later, a game continues until a predetermined requirement for exiting is satisfied. During the game, accompaniment and singing voice are outputted, and in this state the number of mistypings, a score, and a point are accumulated based on typings made by the player.

When the typing-game execution processing ends, the main display 3 displays the game result screen 30 (see FIG. 5) based on a result of the game played in S6 (S7). Then, as described above, the player inputs his/her name through the keyboard 6 so that the inputted name is indicated by the name-input indicator 34. If the score reaches a predetermined score or higher, the name and the score are entered on a ranking, and ranking data that are stored in a RAM 54 (see FIG. 9) are updated.

Then, whether an IC card is inserted in the card insertion slot 10 or not is determined based on a detection signal sent from the card sensor 64 (S8). If it is determined that an IC card is not inserted (S8: NO), the main processing ends. If it is determined that an IC card is inserted (S8: YES), the card reader/writer 65 writes the result of the last game which is stored in the RAM 54, that is, the score and the point acquired, into an IC tag of the IC card (S9). Then, the main processing ends. Data about the game result thus written into the IC tag in S9 can be displayed in S3, if a data check is requested in S3.

The song selection processing S5 included in the main processing will be described with reference to FIG. 12.

First, titles and singer names for all songs stored in the song data storage area 56 of the HDD 55 are acquired (S11). Based on the song titles and the singer names thus acquired, the main display 3 displays a song selection screen 15 (see FIG. 2) (S12).

Then, whether a cursor key 114 is pressed down or not is determined based on a press-down signal sent from the keyboard 6 (S13). If it is determined that a cursor key 114 is pressed down (S13: YES), a cursor 17 appearing on the main display 3 is moved in a direction indicated by the pressed-down cursor key 114 among the cursor keys 114 which indicate up, down, left, and right, respectively (S14).

A song title and a singer name indicated by the selected song indicator 18 and the singer name indicator 19 are renewed into ones pointed by the cursor 17 which has been moved in S14 (S15). Then, the processing returns to S13.

If it is determined that a cursor key 114 is not pressed down (S13: NO), whether an enter key 112 is pressed down or not is determined (S16). If it is determined that an enter key 112 is pressed down (S16: YES), a song currently pointed by the cursor 17 is determined as a song used for this game (S17), and a game starts. If it is determined that an enter key 112 is not pressed down (S16: NO), the processing returns to S13.

The typing-game execution processing S6 included in the main processing will be described with reference to FIG. 13.

First, a set of a video data item and a song data item associated with a song selected in the song selection processing 5S is read out of the video data storage area 59 and the song data storage area 56 in the HDD 55 (S21). Here, lyrics data stored in the lyrics data storage area 56D of the song data storage area 56 are divided on a phrase basis, and temporarily stored in the RAM 54.

Then, the main display 3 displays the main game screen 21 as shown in FIGS. 3B and 4B (S22). At this time, the lyrics indicator 22 and the result-of-input indicator 23 do not indicate any character string or any character, and the record indicator 27 indicates a score of "0".

Then, a PV 20, accompaniment, and singing voice are outputted (S23). To be more specific, the sub display 4 displays a PV 20 (see FIGS. 3A and 4A) of the selected song, based on the video data item read out in S21. Through the speakers 8, accompaniment and singing voice are outputted respectively based on accompaniment data and singing voice data included in the song data read out in S21. Thus, the PV 20 is displayed concurrently with a play of the song.

Subsequently, one phrase of the lyrics data stored in the RAM 54 is acquired, and a character string corresponding to the acquired phrase is, in accordance with a tempo of the play of the song, indicated by the lyrics indicator 22 of the-main game screen 21 (S24).

Further, the number of characters n included in the acquired phrase is calculated out (S25), and then "0" is substituted for a given variable m stored in the RAM 54 (S26).

Whether a key input is done through a character input key 111 or not is determined based on a press-down signal sent from the keyboard 6 (S27). If it is determined that a key input is done (S27: YES), correctness of the typing, i.e., correctness of the inputted character and input timing, is determined based on a press-down signal sent from the key and the criterion data stored in the criterion data storage area 56E (S28). To be more specific, determined are whether a key that is associated with the character string indicated by the lyrics indicator 22 of the main game screen 21 was pressed down or not, and whether the input was done in time with the singing voice or not. If a key different from the associated key was pressed down, it is determined that an incorrect character was inputted. Thus, the number of mistypings increases by one. Then, the processing proceeds to S31.

If it is determined that a key input was not done (S27: NO), whether a predetermined period of time has elapsed or not is determined based on data obtained from the timer 58 (S29). If it is determined that the predetermined period of time has not elapsed (S29: NO), the processing returns to S27. If it is determined that the predetermined period of time has elapsed (S29: YES), the number of mistypings increases by one (S30).

Here, with respect to an input of a first character of one phrase, a measurement of the predetermined period of time starts when the character string is shown in the main game screen 21 in S24. With respect to an input of a character other than the first character, a measurement of the predetermined period of time starts when a score is calculated out in S32.

In S31, the full-color LED 155 disposed inside the key of the keyboard 6 emits a light. Specifically in the typing-game machine 1 according to the first embodiment, if it is determined that a key input was done (S27: YES) with a correct character inputted, the pressed-down character input key 111 emits a blue light. If it is determined that a key input was done (S27:YES) with an incorrect character inputted, the pressed-down character input key 111 emits a red light and at the same time a correct key which should have been pressed down emits a green light. If no key input was done (S27: NO), a correct key which should have been pressed down emits a green light.

Then, a score is calculated out (S32) based on the determination about correctness made in S28. To be more specific, if it was determined in S28 that a correct character was inputted, a score is added. If it was determined in S28 that the input was done in time with the singing voice, an additional score is added.

Subsequently, the variable m stored in the RAM 54 is read out and increased by one, and then stored again (S33). Then, determination is made on whether the variable m reaches n-1 or not, that is, whether inputs of all the characters included in one phrase have been completed or not (S34). If it is determined that the variable m does not yet reach n-1 (S34: NO), the processing returns to S27 in which an input of the next character of the one phrase is determined.

The variable m is a variable used for determining an input of each character included in one phrase. Every time a determination about an input of one character completes, the variable m is increased by one (S33). Accordingly, when m equals t (0≤t≤n-1), an input of a (t+1)-th character, as counted from a top of the phrase, is determined in S27 to S34.

If it is determined that the variable m reaches n-1 (S34: YES), that is, if all the characters included in one phrase have been inputted, a point is calculated out (S35). More specifically, if it is determined that all of the n characters included in one phrase have been correctly inputted within a predetermined period of time (without undergoing the step S30), one point is added.

Then, determination is made on whether inputs of all phrases included in the current stage have been completed or not (S36). If it is determined that inputs of not all the phrases included in one stage have been completed (S36: NO), the processing returns to S24 in which the next phrase is acquired from the RAM 54 and indicated by the lyrics indicator 22 of the main game screen 21.

If it is determined that inputs of all the phrases included in one stage have been completed (S36: YES), then a determination is made on whether inputs of all stages have been completed or not (S37).

If it is determined that inputs of all the stages have been completed (S37: YES), this typing-game execution processing ends irrespective of the points, and the processing proceeds to S7 of the main processing of FIG. 11. If it is determined that inputs of not all the stages have been completed (S37: NO), then whether the number of mistypings is less than a predetermined value or not is determined (S38). In this embodiment, only when the total number of mistypings counted from the beginning of the game is less than a predetermined value, a player can proceed to the next stage. For example, the number of mistypings should be less than twenty in order to proceed from the first stage to the second stage, and should be less than thirty-five in order to proceed from the second stage to the third stage.

If it is determined that the number of mistypings is less than the predetermined value (S38: YES), the processing returns to S24 in which a first phrase of the next stage is acquired from the RAM 54 and indicated by the lyrics indicator 22 of the main game screen 21. Then, the same steps as above are repeated. If it is determined that the number of mistypings is not less than the predetermined value (S38: NO), this typing-game execution processing ends and the processing proceeds to S7 of the main processing of FIG. 11.

In the type-game machine 1 of this embodiment, as described above, the sub display 4 displays the PV 20 of the selected song. Since the PV 20 produces an advertising effect for promoting sales of CDs, DVDs, etc., advertising rates are charged for displaying the PV 20. Accordingly, made within the usage data storage area 201 of the HDD 55 (see FIG. 14) is a database with respect to each song about the number of times a PV 20 is displayed, i.e., the number of times a song is used for a typing game. The data on the database are separated for every company to which a singer singing a song belongs, and used for calculating how much advertising rates should be charged on each record company.

Therefore, a database making processing is performed at a point W1 which comes immediately after S17 of the song selection processing (see FIG. 12), and an advertising-rates determination processing is performed at a point W2 which comes in the middle of a proceeding from S7 to S8 of the main processing (see FIG. 11).

Figure 16:
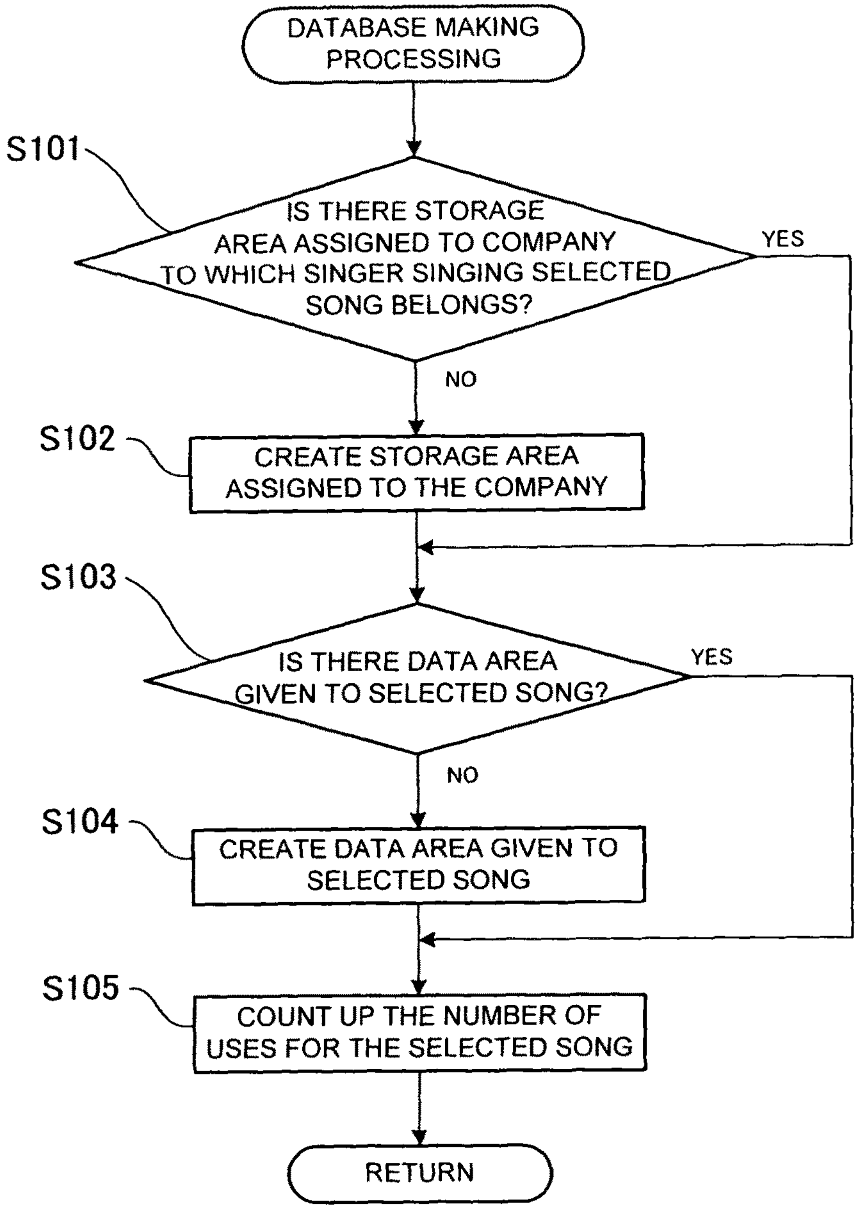
FIG. 16 shows a flowchart of a database making processing that is executed in the typing-game machine.

First, the database making processing will be described with reference to FIG. 16.

Determined in S101 is whether or not storage areas formed in the usage data storage area 201 of the HDD 55 and assigned to respective record company (i.e., the A-Company storage area 202, the B-Company storage area 203, . . . in FIG. 14) include one assigned to the record company to which a singer singing the song determined in S17 belongs. Here, record company name data are read out from the individual data storage area 56I of the song data storage area 56 of the HDD 55 in order to identify the record company to which the singer singing the selected song belongs.

If it is determined that a storage area assigned to the record company exists in the usage data storage area 201 of the HDD 55 (S101: YES), the processing proceeds to S103. If it is determined that a storage area assigned to the record company does not exist in the usage data storage area 201 of the HDD 55 (S101: NO), a new storage area is created in the usage data storage area 201 and assigned to this record company (S102), and then the processing proceeds to S103.

Determined in S103 is whether or not the storage area assigned to the corresponding company includes a data area 301 given to the selected song. Here, song title data are read out of the individual data storage area 56I of the song data storage area 56 of the HDD 55, in order to identify the song. If it is determined that a data area 301 given to the selected song exists (S103: YES), the processing proceeds to S105. If it is determined that a data area 301 given to the selected song does not exist (S103: NO), a new data area 301 given to the song is created in the storage area assigned to the corresponding record company (S104), and then the processing proceeds to S105.

The song title and the singer name for the song determined in S17, which are read out of the individual data storage area 56I of the song data storage area 56, are stored into a SONG TITLE data field and a SINGER NAME data field of the new data area 301.

In S105, the number of uses for the selected song is counted up. That is, in the storage area assigned to the corresponding record company, a value stored in a NUMBER OF USES data field of the data area 301 given to the selected song is increased by one and then stored therein (see FIG. 14). If a new data area 301 given to the selected song is created in the storage area assigned to the corresponding record company (S104), "one" is stored in a NUMBER OF USES data field of this new data area 301. In this way, the number of times a PV 20 of a song is displayed, which means the number of times the song is selected, is stored in a NUMBER OF USES data field of a corresponding data area 301.

In S105, moreover, in the storage area assigned to the corresponding record company, values stored in NUMBER OF USES data fields of respective data areas 301 are added up, and a resulting value is stored in a TOTAL data field of a data area 302. Thus, in a storage area assigned to each record company, the TOTAL data field of the data area 302 stores the total number of times the PVs 20 of songs sung by singers who belong to this company are displayed, that is, the total number of times songs sung by singers who belong to the company are selected.

S105 is followed by S6 of the main processing of FIG. 11.

Next, the advertising-rates determination processing will be described with reference to FIG. 17.

In S111, whether a predetermined period of time has elapsed or not is determined. Here, the predetermined period-of time means, for example, a period of one day, one week, one month, etc. The determination is made based on data obtained from the timer 58 and the like. If it is determined that a predetermined period of time has not elapsed yet (S111: NO), the processing exits from the advertising-rates determination processing without performing any step, and returns to the main processing of FIG. 11 to proceed to S8.

If it is determined that a predetermined period of time has elapsed (S111: YES), advertising rates for each record company are determined based on the advertising-rates table 211 stored in the HDD 55 and the data stored in the usage data storage area 201 (S112).

When, for example, a TOTAL data field of the data area 302 of the A-Company storage area 202 stores a value of "1,271" as shown in FIG. 14, advertising rates are determined to be "×oooo" because "1,271" is in the range of "900 to 1399" listed in a column of the NUMBER OF USES data item of the advertising-rates table 211 shown in FIG. 15.

As shown in FIG. 14, a TOTAL data field of a data area 302 of the B-Company storage area 203 stores a value of "38" which is in the range of "1 to 49" listed in the column of the NUMBER OF USES data item of the advertising-rates table 211 of FIG. 15. Therefore, advertising rates in this case are determined to be "Δo".

S112 is followed by S113 in which data stored in the usage data storage area 201 are backed up in another area within the HDD 55. Then, the processing proceeds to S114.

In S114, the usage data storage area 201 is initialized. At the same time the measurement of the predetermined period of time, which is needed in S111, is reset. That is, at the point of S114, the usage data storage area 201 is renewed and started to be a new database. Thereafter, the processing exits from the advertising-rates determination processing, and returns to the main processing of FIG. 11 to proceed to S8.

The advertising rates thus determined are charged on each record company by means of, for example, sending a bill via mail or via the server 80.

In the above-described embodiment, the CPU 51 functions as a "determination unit" in S28, and as a "database making unit" in S105. If, with respect to a song determined in S17, the database does not include a storage area assigned to a corresponding record company and/or a data area 301 given to the song, the CPU 51 functions as a "database making unit" in S101 to S105. The CPU 51 further functions as an "advertising-rates determination unit" in S112.

In the typing-game machine 1 of this embodiment, as thus far described above, the database making processing (see FIG. 16) is executed at the point W1 which comes after a song selection is determined in S17 of the song selection processing (see FIG. 12). Accordingly, in the usage data storage area 201 of the HDD 55, the total number of times songs sung by singers belonging to each record company are used for typing games is stored in a TOTAL data field of a data area 302. Therefore, advertising rates which will be charged on each record company can be determined with reference to this database (S112). Thus, it becomes easy to collect advertising rates in accordance with the number of times songs are used for typing games.

The "video data item" may be a moving image including forwarding frames, fast-forwarding frames, rewinding frames, etc., or may be a still image, too.

In the above embodiment, the "video data item" means data concerning the PV 20 of a song which is displayed on the sub display 4 in accordance with the course of the song played by the CPU 51 and the sound control circuit 61. However, the "video data item" may be other images unconcerned with the current song, e.g., a CM image, an animation image, a PV of a singer other than the singer singing the current song, etc.

The typing-game machine 1 of the above embodiment is connected to the server 80, and data associated with songs, which include a set of a video data item and a song data item for each song, stored in the HDD 55 can be updated by downloading data from the server 80. However, this is not limitative. The typing-game machine 1 may not be connected to the server 80, and the data associated with songs and stored in the HDD 55 may be non-updatable. In addition, it may also be possible to update data independently of the server 80.

The game system 100 shown in FIG. 8 may include a plurality of servers 80.

The song title indicator 16 may indicate not only a song title but also an image of a singer or a PV.

The song selection screen 15 and the game result screen 30 may be displayed on the sub display 4 instead of the main display 3.

In the above embodiment, the main display 3 displays the main game screen 21 while the sub display 4 displays a video image such as a PV 20 of a song, etc. However, it may also be possible that the main display 3 displays a video image such as the PV 20 and the sub display 4 displays the main game screen 21.

A positional relationship between the main display 3 and the sub display 4 is not limited to one employed in the above embodiment. For example, the main display 3 may be disposed above the sub display 4, or alternatively the main display 3 and the sub display 4 may be disposed side by side on the same level.

A single display screen serving as both first and second image display units may be provided. In this case, the single display screen may have an area for displaying a character string which is a part of lyrics of a song and an area for displaying a video image based on the video data item.

Illustrated in the above embodiments is a cabinet-type machine which is placed in a game arcade or the like. However, this is not limitative. The present invention is applicable to a typing-game machine that offers a game playable on a PC having two display screens or a PC having two display areas made in a single display screen, by installing in the individual PC typing-game software.

Figure 18:
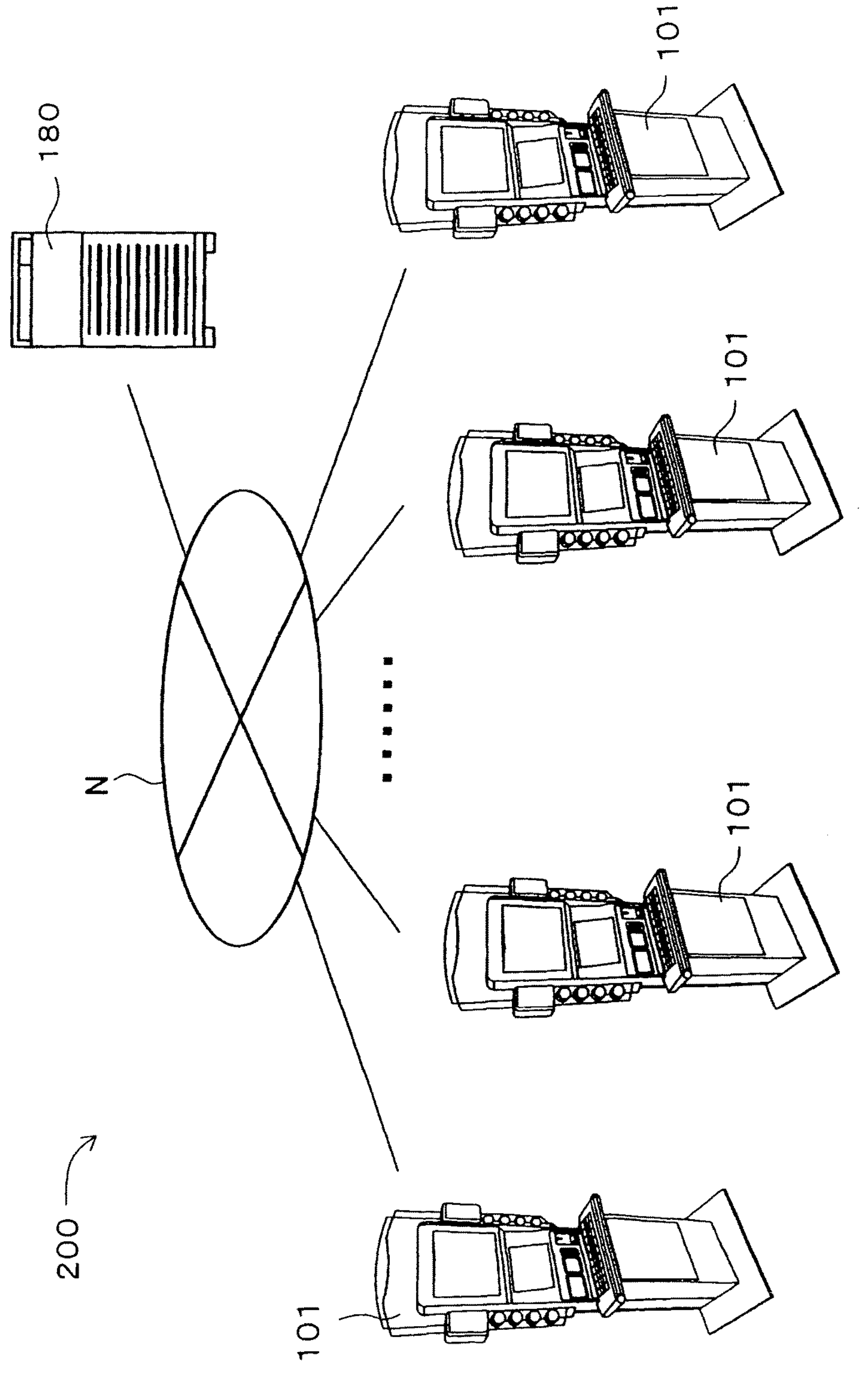
FIG. 18 is a block diagram showing a database system including many typing-game machines and a server that is connected in communication with the respective typing-game machines.

In the above embodiment, the usage data storage area 201 (see FIG. 14), which functions as a database with respect to each song about the number of times a video image associated with a song is displayed along with a play of the song, is formed in the HDD 55 of the typing-game machine 1, and at the same time the advertising-rates table 211 (see FIG. 15) is provided in the HDD 55. However, this is not limitative. For example, the present invention may be applied to a database system 200 as shown in FIG. 18. In the database system 200, the usage data storage area 201 is formed in a sever 180 and the advertising-rates table 211 is provided in the server 180. Since respective typing-game machines 101 are connected in communication with the server 180 via a network N, the database formed in the server 180 is shared among all the typing-game machines 101 connected to the server 180. The database system 200 of FIG. 18 can also produce the same effect as of the above embodiment, that is, "it becomes easy to collect advertising rates in accordance with the number of times songs are used for typing games" by the database system 200, too.

In the database system 200 of FIG. 18, every time a typing game is played in a typing-game machine 101, data associated with a song used for the game may be transmitted from the typing-game machine 101 to the server 180. Alternatively, it is also possible that each typing-game machine 101 makes a database, which is transmitted to the server 180 every predetermined period. In this way, the server 180 may make a database based on the information sent from each typing-game machine 101.

Figure 17:
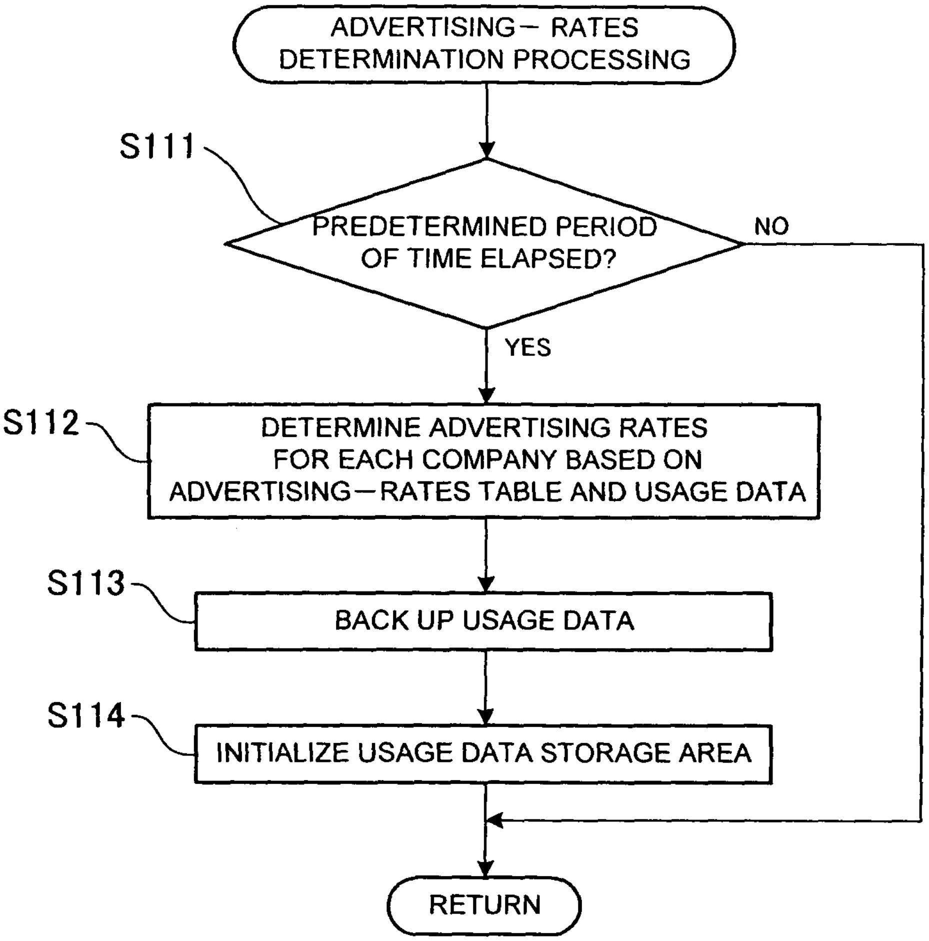
FIG. 17 shows a flowchart of an advertising-rates determination processing that is executed in the typing-game machine.
Figure 19:
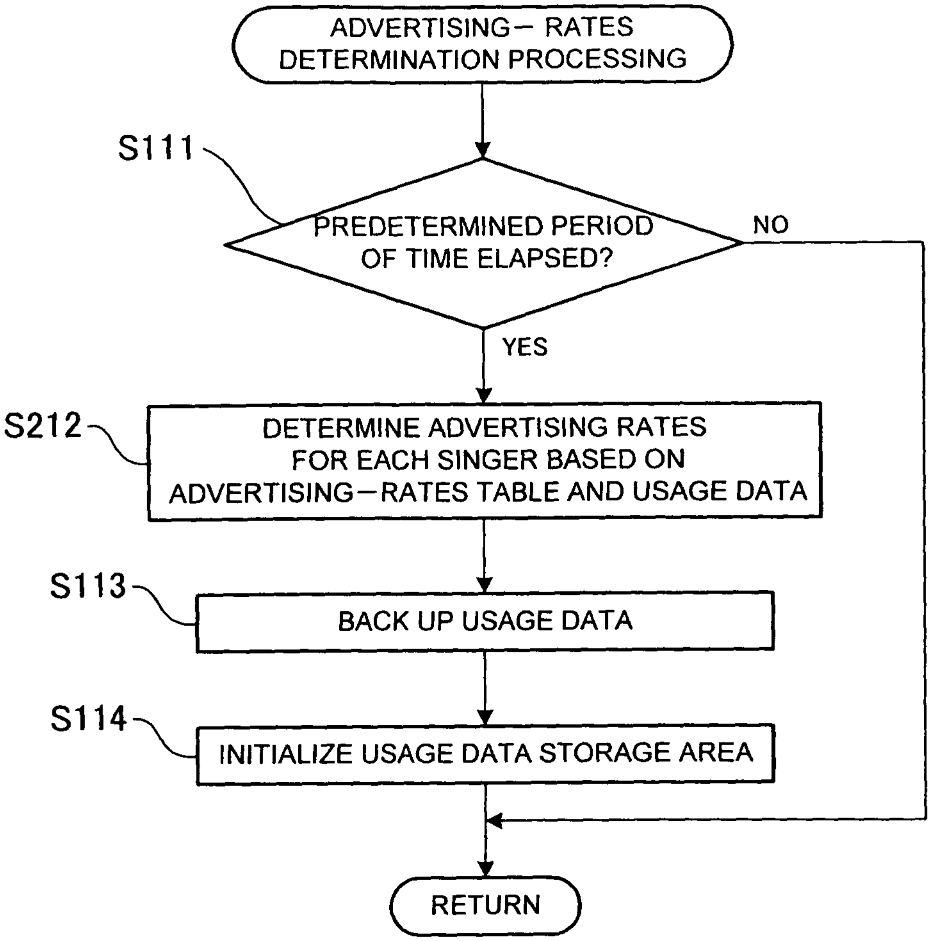
FIG. 19 shows a flowchart of another example of an advertising-rates determination processing that is executed in the typing-game machine.

In the advertising-rates determination processing of the above embodiment shown in FIG. 17, advertising rates for each record company are determined (S112). However, alternatively, advertising rates for each singer of a company may be determined (S212 of FIG. 19)

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A typing-game machine comprising:

a storage unit that stores data associated with a song, the song needing an advertising effect for promoting sales, the data associated with the song comprising a set of a video data item and a song data item, the set of the video data item and the song data item demonstrating the advertising effect;

a music playing unit that plays the song based on the song data item among a plurality of song data items stored in the storage unit;

a first image display unit that sequentially displays, in accordance with a play of the song made through the music playing unit, a character string which is a part of lyrics of the song;

a second image display unit that displays a video image based on, among a plurality of video data items stored in the storage unit, the video data item associated with the song played by the music playing unit;

an input unit, comprising a plurality of keys respectively associated with a plurality of characters;

a determination unit that determines, based on a criterion included in the song data item, whether a character string inputted by typing the plurality of keys of the input unit agrees with the character string displayed through the first image display unit;

a game course control unit that controls a course of a game based on a result of a determination made by the determination unit;

a database making unit that makes, as a database of sales-promotion advertising rates, a database with respect to the song about a number of times the video image associated with the song is displayed through the second image display unit along with the play of the song made through the music playing unit; and an advertising-rates determination unit which determines advertising rates based on the database made by the database making unit and includes an advertising-rates table indicating an advertising rate corresponding to the number of times the video image is displayed, the advertising rate corresponding to the number of times belonging to a first range being different from the advertising rate corresponding to the number of times belonging to a second range, wherein the database making unit comprises a plurality of storage areas, and makes the database by counting the number of times the video image associated with the song is displayed and storing the counted number of times in a storage area corresponding to a group to which the song belongs among the plurality of storage areas, and wherein the advertising-rates determination unit determines the advertising rate for each group to which the song belongs based on the advertising-rates table and the number of times, which is stored in the corresponding storage area of the database, the video image associated with the song is displayed.

2. The typing-game machine according to claim 1, wherein the database making unit makes the database whose data are separated for a company to which the song belongs, and wherein the advertising-rates determination unit determines, based on the database made by the database making unit, advertising rates with respect to the company.

3. The typing-game machine according to claim 1, wherein the database making unit makes the database whose data are separated for a company to which the song belongs; and the advertising-rates determination unit determines, based on the database made by the database making unit, advertising-rates with respect to a singer of the company.

4. A database system including a plurality of typing-game machines and a server connected in communication with the respective typing-game machines via a network, the typing-game machines comprising:

a storage unit that stores data associated with a song, the song needing an advertising effect for promoting sales, the data associated with the song comprising a set of a video data item and a song data item, the set of the video data item and the song data item demonstrating the advertising effect;

a music playing unit that plays the song based on the song data item among a plurality of song data items stored in the storage unit;

a first image display unit that sequentially displays, in accordance with a play of the song made through the music playing unit, a character string which is a part of lyrics of the song;

a second image display unit that displays a video image based on, among a plurality of video data items stored in the storage unit, the video data item associated with the song played by the music playing unit;

an input unit, comprising a plurality of keys respectively associated with a plurality of characters;

a determination unit that determines, based on a criterion included in the song data item, whether a character string inputted by typing the plurality of keys of the input unit agrees with the character string displayed through the first image display unit ; and a game course control unit that controls a course of a game based on a result of a determination made by the determination unit, wherein the server comprises:

a database making unit that makes, as a database of sales-promotion advertising rates, a database with respect to the song about a number of times the video image associated with the song is displayed in each typing-game machine through the second image display unit along with the play of the song made through the music playing unit; and an advertising-rates determination unit which determines advertising rates based on the database made by the database making unit and includes an advertising-rates table indicating an advertising rate corresponding to the number of times the video image is displayed, the advertising rate corresponding to the number of times belonging to a first range being different from the advertising rate corresponding to the number of times belonging to a second range, wherein the database making unit comprises a plurality of storage areas, and makes the database by counting the number of times the video image associated with the song is displayed and storing the counted number of times in a storage area corresponding to a group to which the song belongs among the plurality of storage areas, and wherein the advertising-rates determination unit determines the advertising rate for each group to which the song belongs based on the advertising-rates table and the number of times, which is stored in the corresponding storage area of the database, the video image associated with the song is displayed.

5. The database system according to claim 4, wherein the database making unit makes the database whose data are separated for a company to which the song belongs, and wherein the advertising-rates determination unit determines, based on the database made by the database making unit, advertising rates with respect to the company.

6. The database system according to claim 4, wherein:

the database making unit makes the database whose data are separated for a company to which the song belongs; and wherein the advertising-rates determination unit determines, based on the database made by the database making unit, advertising rates with respect to a singer of the company.

7. An apparatus comprising:

a storage unit that stores data associated with a song, the song needing an advertising effect for promoting sales, the data associated with the song comprising a set of a video data item and a song data item, the set of the video data item and the song data item demonstrating the advertising effect;

a music playing unit that plays the song based on the song data item among a plurality of song data items stored in the storage unit;

a first image display unit that sequentially displays, in accordance with a play of the song made through the music playing unit, a character string which is a part of lyrics of the song;

a second image display unit that displays a video image based on, among a plurality of video data items stored in the storage unit, the video data item associated with the song played by the music playing unit;

an input unit, comprising a plurality of keys respectively associated with a plurality of characters;

a determination unit that determines, based on a criterion included in the song data item, whether a character string inputted by typing the plurality of keys of the input unit agrees with the character string displayed through the first image display unit ;

a database making unit that makes, as a database of sales-promotion advertising rates, a database with respect to the song about a number of times the video image associated with the song is displayed through the second image display unit along with the play of the song made through the music playing unit; and an advertising-rates determination unit which determines advertising rates based on the database made by the database making unit and includes an advertising-rates table indicating an advertising rate corresponding to the number of times the video image is displayed, the advertising rate corresponding to the number of times belonging to a first range being different from the advertising rate corresponding to the number of times belonging to a second range, wherein the database making unit comprises a plurality of storage areas, and makes the database by counting the number of times the video image associated with the song is displayed and storing the counted number of times in a storage area corresponding to a group to which the song belongs among the plurality of storage areas, and wherein the advertising-rates determination unit determines the advertising rate for each group to which the song belongs based on the advertising-rates table and the number of times, which is stored in the corresponding storage area of the database, the video image associated with the song is displayed.

8. The apparatus according to claim 7, wherein the database making unit, when the video image displayed in the image display unit is displayed, determines whether the group to which the song associated with the video image belongs corresponds to the plurality of storage areas, and generates a new storage area corresponding to the group to which the song belongs when the group to which the song belongs does not correspond to the plurality of storage areas.

9. The apparatus according to claim 7, wherein the apparatus comprises a typing-game machine which receives a typing input according to the song.

10. A server to which a plurality of apparatuses are connected via a network, wherein each of the plurality of apparatuses comprising:

a storage unit that stores data associated with a song, the song needing an advertising effect for promoting sales, the data associated with the song comprising a set of a video data item and a song data item, the set of the video data item and the song data item demonstrating the advertising effect;

a music playing unit that plays the song based on the song data item among a plurality of song data items stored in the storage unit; and a first image display unit that sequentially displays, in accordance with a play of the song made through the music playing unit, a character string which is a part of lyrics of the song;

a second image display unit that displays a video image based on, among a plurality of video data items stored in the storage unit, the video data item associated with the song played by the music playing unit;

an input unit, comprising a plurality of keys respectively associated with a plurality of characters; and a determination unit that determines, based on a criterion included in the song data item, whether a character string inputted by typing the plurality of keys of the input unit agrees with the character string displayed through the first image display unit ;

wherein the server comprises:

a database making unit that makes, as a database of sales-promotion advertising rates, a database with respect to the song about a number of times the video image associated with the song is displayed through the second image display unit along with the play of the song made through the music playing unit; and an advertising-rates determination unit which determines advertising rates based on the database made by the database making unit and includes an advertising-rates table indicating an advertising rate corresponding to the number of times the video image is displayed, the advertising rate corresponding to the number of times belonging to a first range being different from the advertising rate corresponding to the number of times belonging to a second range, wherein the database making unit comprises a plurality of storage areas, and makes the database by counting the number of times the video image associated with the song is displayed and storing the counted number of times in a storage area corresponding to a group to which the song belongs among the plurality of storage areas, and wherein the advertising-rates determination unit determines the advertising rate for each group to which the song belongs based on the advertising-rates table and the number of times, which is stored in the corresponding storage area of the database, the video image associated with the song is displayed.

11. The server according to claim 10, wherein the database making unit, when the video image displayed in the image display unit is displayed, determines whether the group to which the song associated with the video image belongs corresponds to the plurality of storage areas, and generates a new storage area corresponding to the group to which the song belongs when the group to which the song belongs does not correspond to the plurality of storage areas.

12. The apparatus according to claim 10, wherein the apparatus comprises a typing-game machine which receives a typing input according to the song.

* * * * *